United States Patent [19]
Cho

[11] Patent Number: 6,022,288
[45] Date of Patent: Feb. 8, 2000

[54] FIVE-SPEED AUTOMATIC TRANSMISSION AND HYDRAULIC CONTROL SYSTEM THEREOF

[75] Inventor: Yeong-Soo Cho, Seoul, Rep. of Korea

[73] Assignee: KIA Motors Corp., Seoul, Rep. of Korea

[21] Appl. No.: 08/990,768

[22] Filed: Dec. 15, 1997

[30] Foreign Application Priority Data

Feb. 26, 1997 [KR] Rep. of Korea .......................... 97-5945
Feb. 26, 1997 [KR] Rep. of Korea .......................... 97-5946

[51] Int. Cl.[7] ...................................................... F16H 3/62
[52] U.S. Cl. ................................................................ 475/276
[58] Field of Search .................................... 475/269, 275, 475/276, 281

[56] References Cited

U.S. PATENT DOCUMENTS 4,263,823 4/1981 Numazawa et al. ..................... 475/269
5,769,749 6/1998 Funahashi et al. ...................... 475/276

FOREIGN PATENT DOCUMENTS 51-48062 4/1976 Japan .
93-10896 11/1993 Rep. of Korea .

Primary Examiner—Sherry L. Estremsky
Attorney, Agent, or Firm—Fleshner & Kim

[57] ABSTRACT

A five-forward speed automatic transmission, includes: a torque convertor connected to an output shaft of an engine for changing and transmitting engine torque; an input shaft connected to an output member of the torque convertor; first, second and third planetary gearsets disposed between the input and output shafts so as to shift power transmitted to the input shaft in five-forward speeds and one reverse speed; a first clutch selectively connecting a sun gear of the second planetary gearset to the input shaft; a second clutch selectively connecting a sun gear of the first planetary gearset to the input shaft; a third clutch selectively connecting a planet pinion gear carrier of the first planetary gearset to the input shaft; a fourth clutch selectively connecting a sun gear and a planet pinion gear carrier of the third planetary gearset with each other; a first one-way clutch for ensuring that the sun gear of the first planetary gearset and a ring gear of the second planetary gearset rotate in a single direction; a second one-way clutch for ensuring that the sun gear of the third planetary gearset rotates in a single direction; a first brake for fixing the sun gear of the first planetary gearset relative to a housing; a second brake for fixing both the ring gear of the second planetary gearset and the sun gear of the first planetary gearset relative to a housing; and a third brake for fixing the sun gear of the third planetary gearset relative to a housing.

20 Claims, 16 Drawing Sheets

FIVE-SPEED AUTOMATIC TRANSMISSION AND HYDRAULIC CONTROL SYSTEM THEREOF

BACKGROUND OF THE INVENTION

1. Field of the Invention

The present invention relates to a five-speed automatic transmission which is mounted on a front-engine rear-wheel drive vehicle, and a hydraulic control system thereof.

2. Background of the Related Art

As is widely known, an automatic transmission for a vehicle comprises at least two planetary gearsets. Each planetary gearset includes three elements: a sun gear; a ring gear; and a planet pinion gear carrier supporting at least one pinion gear engaged with and arranged between the sun and ring gears. Shifting operations are performed by selecting one of the elements as a reacting element, another as an input element, and another as an output element.

A conventional 4-speed automatic transmission includes a conventional 3-speed automatic transmission assembly having two planetary gearsets, and additionally includes an overdrive assembly or underdrive assembly, which includes an additional planetary gearset.

Japanese laid-open Patent Publication No. S51-48062 discloses a five-forward speed, two-reverse speed automatic transmission which includes, in combination, two sets of single pinion planetary gearsets and a double pinion planetary gearset. In this automatic transmission, however, the operational states of two clutch members and two brake members must be switched when shifting from a second speed to a third speed or vice versa. This causes a shift shock to occur, and the shift control is relatively complicated.

To solve the above described problem, Korean Patent Publication No. 93-10896 discloses a five-speed automatic transmission including three sets of single pinion planetary gearsets, each of which has a sun gear, a ring gear, and a planet pinion carrier supporting a planetary pinion gear engaged with and arranged between the sun and ring gears. In this transmission, the ring gear of the first planetary gearset is permanently connected to the planet carrier of the second planetary gearset, or is selectively connected to the planet carrier of the second planetary gearset through a friction member (i.e., a clutch or a brake). Furthermore, the planet pinion gear carrier of the first planetary gearset is selectively connected to the ring gear of the third planetary gearset through a friction member. The sun gear of the first planetary gearset is permanently connected to the planet pinion gear carrier of the third planetary gearset, or is selectively connected to the same through a friction member.

In this transmission, to alleviate a shift shock, additional elements besides a one-way clutch are used for the friction members, which makes the structure complicated, and increases the overall size. Thus, there is an increase in the manufacturing cost.

The above references are incorporated by reference herein where appropriate for appropriate teachings of additional or alternative details, features and/or technical background.

SUMMARY OF THE INVENTION

The present invention is provided to solve the above described problems of the related art.

It is an object of the present invention to provide an automatic transmission having a simple structure, which can alleviate shift shock and reduce manufacturing costs.

To achieve the above objects, in one embodiment of the present invention, a five-speed automatic transmission comprises: a torque convertor connected to an output shaft of an engine for changing and transmitting engine torque; an input shaft connected to an output member of the torque convertor; first, second and third planetary gearsets disposed between the input shaft and an output shaft so as to transmit power from the input shaft to the output shaft; a first clutch selectively connecting a sun gear of the second planetary gearset to the input shaft; a second clutch selectively connecting a planet carrier of the first planetary gearset to the input shaft; a third clutch selectively connecting a sun gear of the first planetary gearset to the input shaft; a fourth clutch selectively connecting a sun gear and a planet pinion gear carrier of the third planetary gearset with each other; a first one-way clutch for ensuring that the planet pinion gear carrier of the first planetary gearset and the ring gear of the second planetary gearset rotate in a single direction; a second one-way clutch for ensuring that the sun gear of the third planetary gearset rotates in a single direction; a first brake for fixing the sun gear of the first planetary gearset to the transmission casing; a second brake for fixing both the ring gear of the second planetary gearset and the planet pinion gear carrier of the first planetary gearset to the transmission casing; and a third brake for fixing the sun gear of the third planetary gearset to the transmission casing. The ring gears of the first and third planetary gearsets are connected to the planet pinion gear carrier of the second planetary gearset by a connecting member. In addition, the planet pinion gear carrier of the third planetary gearset is connected to the output shaft of the transmission.

A hydraulic control system of a five-speed automatic transmission embodying the invention includes: a line pressure regulator valve for converting hydraulic pressure supplied by a hydraulic pump into line pressure and for feeding the line pressure to a manual valve; a pilot valve controlling the line pressure passing through the manual valve with internal pilot pressure; a plurality of solenoid valves parallely disposed so as to control hydraulic pressure fed through the pilot valve; a plurality of control valves for directing hydraulic pressure to each friction member of the transmission in accordance with the operation of the solenoid valves; a pair of safety valves that operate so as to prevent hydraulic pressure from being fed to improper friction members; a plurality of accumulators mounted between each control valve and each friction member so as to alleviate shift shock caused when hydraulic pressure is applied to each friction member when shifting; a torque convertor reducing valve for reducing hydraulic pressure directed toward the torque convertor through the line pressure regulator valve; a lock-up control valve directing hydraulic pressure fed from the torque convertor reducing valve toward a lock-up clutch; and a directional control valve controlled by line pressure so as to direct hydraulic pressure toward the lock-up control valve. One of the pair of the safety valves is for preventing a fourth clutch from being applied when a third brake is being applied, and the other of the pair of the safety valves is for preventing hydraulic pressure acting on the first brake from acting on other friction members when the first brake is being applied and the first brake is operated improperly.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

Preferred embodiments of the invention will be described in conjunction with the accompanying drawings in which like elements are identified with like reference numbers, and wherein.

DETAILED DESCRIPTION OF PREFERRED EMBODIMENTS

Figure 1:
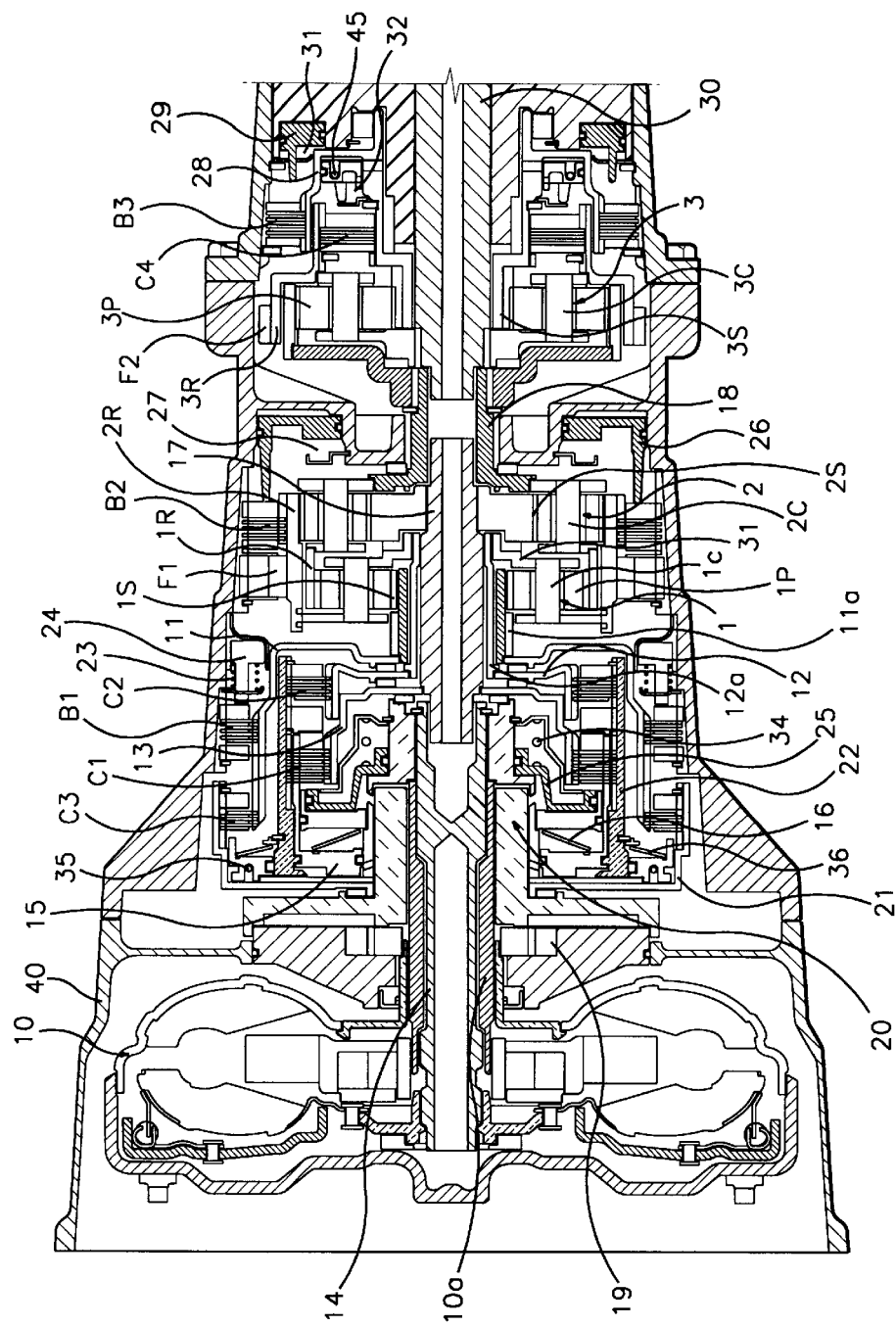
FIG. 1 is a longitudinal sectional view illustrating a five-forward speed, one-reverse speed automatic transmission in accordance with a preferred embodiment of the present invention.
Figure 2:
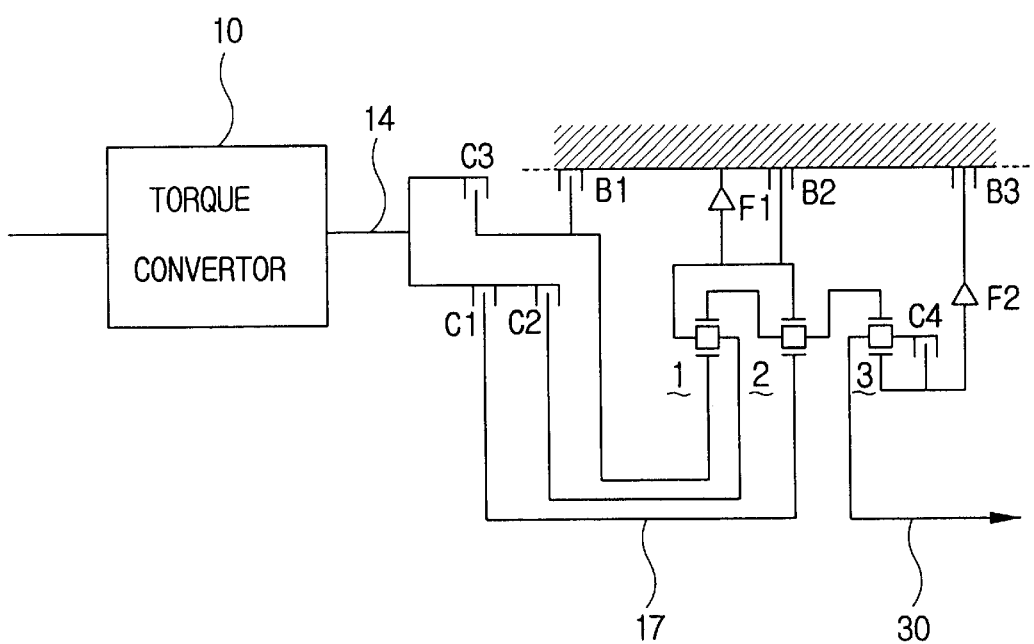
FIG. 2 is a schematic diagram showing the power train of the automatic transmission depicted in FIG. 1.

Referring first to FIGS. 1 and 2, a five-speed automatic transmission according to the present invention includes: a torque convertor 10 connected to an output shaft of an engine to vary the torque transmitted from the engine; a planetary gear assembly for shifting the power of the engine transmitted from the torque converter 10; and a transmission casing 40 housing the torque convertor 10 and the shift gearset.

The planetary gear assembly comprises three sets of single pinion planetary gearsets 1, 2 and 3. The planetary gearsets 1, 2 and 3 respectively include sun gears 1S, 2S and 3S, ring gears 1R, 2R, 3R. Also, planet pinion gear carriers 1C, 2C, and 3C respectively support planet pinion gears 1P, 2P, 3P, which are respectively engaged with and between the sun gears 1S, 2S and 3S and the ring gears 1R, 2R, and 3R. The sun gears 1S, 2S and 3S, the ring gears 1R, 2R and 3R and the planet pinion gear carriers 1C, 2C and 3C are selectively connected to the input shaft through first to fourth clutches C1, C2, C3 and C4 and first to third brakes B1, B2 and B3. The above assembly will be described more in detail hereinafter.

The sun gear 1S of the first planetary gearset 1 is integrally formed with a first hollow shaft 11a of a first hub assembly 11 which is connected to a first clutch drum 21 of a first clutch drum assembly 20. The third clutch C3 is a reverse clutch which is applied only in a reverse "R" range.

The clutch drum assembly 20 receives power from the torque convertor 10 through an input shaft 14 engaged with a stator shaft 10a of the torque convertor 10. The clutch drum assembly 20 further includes a second clutch drum 22 that is longer than the first clutch drum 21 so that the first and second clutches C1 and C2 are carried thereon in series. The first clutch C1 slides along splines formed on the second clutch drum 22 and the third hub assembly 13, under the action of a first piston 15, which is actuated by hydraulic pressure. Forward movement, or engagement, of the first clutch C1 causes the second clutch drum 22 and the third hub assembly 13 to be engaged with each other and to rotate together. The second clutch C2 slides along splines formed on the second clutch drum 22 and the second hub assembly 12 under the action of a second piston 25, which is also actuated by hydraulic pressure. Forward movement, or engagement, of the second clutch C2 causes the second clutch drum 22 and the second hub assembly 12 to engage with each other and rotate together. The third clutch C3 slides along splines formed on the first clutch drum 21 and the first hub assembly 11 under the action of a third piston 35, which is actuated by hydraulic pressure. Forward movement, or engagement, of the third clutch C3 causes the first clutch drum 21 to engage with and rotate with the first hub assembly 11.

As described above, the first, second and third clutches C1, C2 and C3 are respectively engaged by the pistons 15, 25 and 35, which are actuated by hydraulic fluid pressurized by a hydraulic pump 19. The first, second and third clutches C1, C2 and C3 return to their initial disengaged positions when hydraulic pressure is released. The hydraulic pump 19 is provided on the outer surface of the stator shaft 10a and is driven by the rotating force of the stator shaft 10a during operation of an engine attached to the stator shaft 10a.

The second hub assembly 12 has a second hollow shaft 12a connected to the planet pinion gear carrier 1C of the first planetary gearset 1 by means of a connecting member 31. When the second clutch C2 is engaged, the power transmitted to the clutch drum assembly 20 is transmitted to the planet pinion gear carrier 1C of the first planetary gearset 1 through the second hub assembly 12. The third hub assembly 13 is connected to an intermediate shaft 17 engaged with the sun gear 2S of the second planetary gearset 2. When the first clutch C1 is engaged, the power transmitted to the clutch drum assembly 20 is transmitted to the sun gear 2S of the second planetary gearset 2 through the third hub assembly 13.

The planet pinion gear carrier 2C of the second planetary gearset 2 is connected through a connecting member 18 to the ring gear 3R of the third planetary gearset 3. The planet pinion gear carrier 3C of the third planetary gearset 3 functions as an output portion by being connected to the output shaft 30.

The sun gear 3S of the third planetary gearset 3 is engaged or disengaged with the planet pinion gear carrier 3C by the fourth clutch C4, which acts as an overdrive clutch. The overdrive clutch C4 is applied in fourth and fifth speeds of the drive "D" range. Therefore, by engagement of the fourth clutch C4, the sun gear 3S and the planet pinion gear carrier 3C of the third planetary gearset 3 provide an overdrive speed. When hydraulic pressure is released from the fourth clutch, the fourth clutch is biased by a spring 32 back to its initial, disengaged position.

The first brake B1 is a multi-plate brake that slides along splines formed on the transmission casing 40 and the first hub assembly 11. The first brake B1 is applied by a piston 24, which locks the sun gear 1S of the first planetary gearset 1 relative to the transmission casing 40. The piston 24 for the first brake B1 is also actuated by hydraulic pressure, and when hydraulic pressure is released from the first brake B1, the first brake B1 is biased to its initial, disengaged position by a spring 23.

A spline is provided on an outer surface of the ring gear 2R of the second planetary gearset 2, and a second multi-plated brake B2 is formed between the spline and a spline of the transmission casing 40. When the second brake B2 is applied by a piston 26, the ring gear 2R of the second planetary gearset 2, which rotates with the planet pinion gear carrier 1C of the first planetary gearset 1, is locked relative to the transmission casing 40. The piston 26 for the second brake B2 is also actuated by hydraulic pressure, and when the hydraulic pressure is released therefrom, the brake is biased back to its initial, disengaged position.

A forward one-way clutch F1 is carried on a side surface of the second brake B2. The forward one-way clutch F1 prevents the ring gear 2R of the second planetary gearset 2 from rotating in a reverse direction when the transmission is operating in an overdrive speed.

The sun gear 3S of the third planetary gearset 3 is locked relative to the transmission casing 4 by a third brake B3, which is activated by a piston 29. The third brake B3 slides along a spline formed on the connecting member 28 connected to the sun gear 3S of the third planetary gearset 3 and a spline formed on the transmission casing 40. The piston 29 for the third brake B3 is also actuated by hydraulic pressure, and when the hydraulic pressure is released therefrom, the third brake B3 is biased to its initial, disengaged position. In addition, the third brake B3 is connected to a second one-way clutch F2 so as to prevent the sun gear 3S of the third planetary gearset 3 from rotating in a reverse direction when the transmission is operating in an overdrive speed.

The operation of the above described automatic transmission in each speed will be described hereinafter with reference to the following Table 1, which indicates the condition of the clutches, brakes and one-way clutches at each speed.

TABLE 1

| Speed Range | Gear Position | Engine Brake | C1 | C2 | C3 | C4 | B1 | B2 | B3 | F1 | F2 |
|---|---|---|---|---|---|---|---|---|---|---|---|
| P |   |   |   |   |   |   |   |   |   |   |   |
| R |   |   |   |   | • |   |   | • | • |   |   |
| N |   |   |   |   |   |   |   |   |   |   |   |
| D | 1 normal |   | • |   |   |   |   |   |   | • | • |
|   | coasting | • | • |   |   |   |   | • | • |   |   |
|   | 2 normal |   | • |   |   |   |   | • |   |   | • |
|   | coasting | • | • |   |   |   |   | • |   |   |   |
|   | *lock-up |   | • |   |   |   |   | • |   |   | • |
|   | 3 normal |   | • | • |   |   |   |   |   |   | • |
|   | coasting | • | • | • |   |   |   | • |   |   |   |
|   | *lock-up |   | • | • |   |   |   |   |   |   | • |
|   | 4 normal |   | • | • |   | • |   |   |   |   |   |
|   | lock-up |   | • | • |   | • |   |   |   |   |   |
|   | 5 normal |   | • |   |   | • | • |   |   |   |   |
|   | lock-up |   | • |   |   | • | • |   |   |   |   |

*-partial lock-up

Parking "P" and Neutral "N" Ranges

In these ranges, hydraulic pressure is not applied to the shift unit of the transmission. In the parking "P" range where engine operation is stopped, all of the friction members (i.e., brakes and clutches) which have been applied are released while hydraulic pressure which has been applied to the corresponding pistons is released. In the neutral "N" range, although the engine is in operation, the power of the engine is not transmitted to the output shaft.

Reverse "R" Range

In the R range, as shown in Table 1, the third clutch C3 is engaged and the second brake B2 and the third brake B3 are applied.

In a transmission embodying the present invention, the engine is used as a brake when the transmission is operated in the reverse speed. As is widely known, it is possible to use the engine as a brake by obtaining braking force from the compression force of the engine when the vehicle runs downward on a slope.

Figure 3:
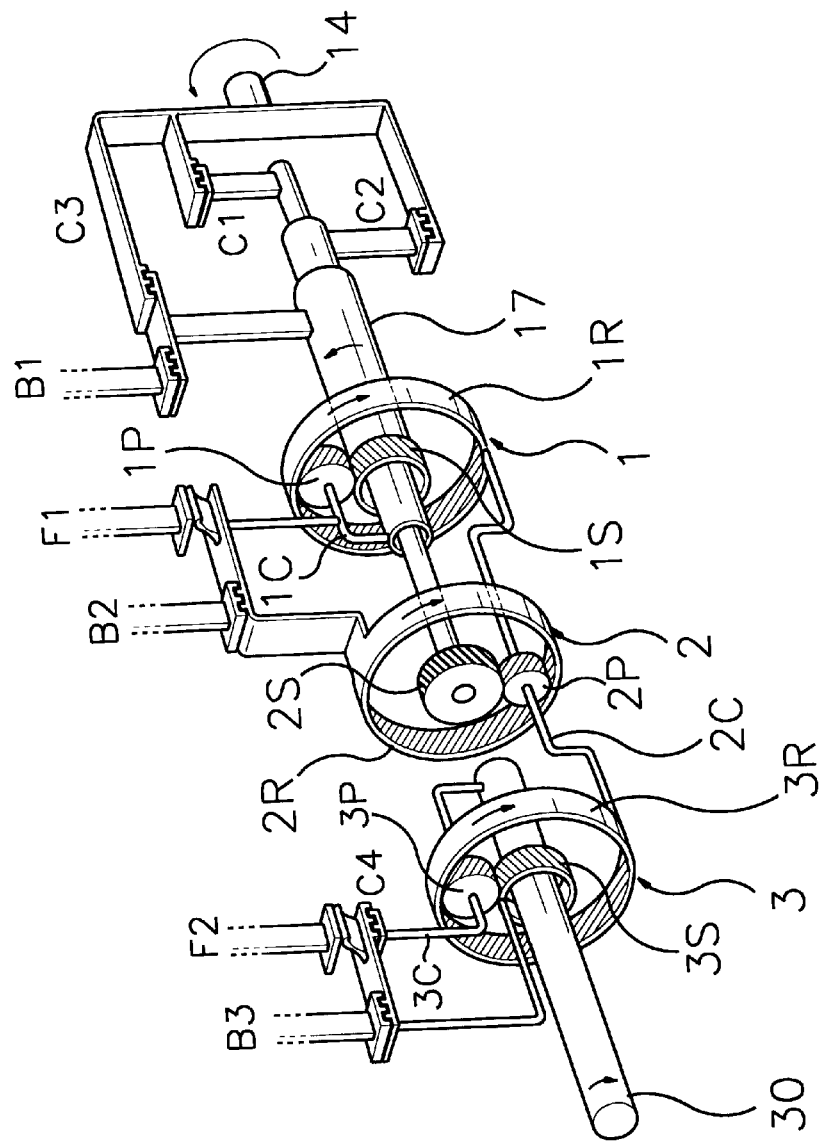
FIG. 3 is a perspective view showing the power train when the automatic transmission is in a reverse "R" range.

Referring to FIG. 3, when the third clutch C3 is engaged, torque is transmitted from the input shaft 14 to the sun gear 1S of the first planetary gearset 1. The rotating force transmitted to the sun gear 1S causes the planet pinion gear 1P, which is engaged with the sun gear 1S, to rotate about its axis. At this point, since the planet pinion gear carrier 1C supporting the planet pinion gear 1P is locked by the second brake B2, the ring gear 1R engaged with the planet pinion gear 1P rotates in the same direction as the planet pinion gear 1P, that is, in a direction opposite to that of the sun gear 1S.

In addition, since the planet pinion gear carrier 2C of the second planetary gearset 2 is connected to the ring gear 1R of the first planetary gearset 11, the planet pinion gear carrier 2C rotates in the same direction as the ring gear 1R. The rotation of the planet pinion gear carrier 2C causes the planet pinion gear 2P to rotate about the ring gear 2R because the second brake B2 keeps the ring gear 2R from rotating. The planet pinion gear 2P rotates in the same direction as the sun gear 1S of the first planetary gearset 1.

Also, because the ring gear 3R of the third planetary gearset 3 is connected to the planet pinion gear carrier 2C of the second planetary gearset 2, the ring gear 3R rotates in the rotating direction of the planet pinion gear carrier 2C of the second planetary gearset 2. Since the sun gear 3S of the third planetary gearset 3 is locked by the third brake B3, the planet pinion gear carrier 3C of the third planetary gearset 3 rotates around the ring gear 3R in the same direction as the planet pinion gear carrier 2C of the second planetary gearset 2. The rotation of the planet pinion gear carrier 3C of the third planetary gearset is thus transferred to the output shaft 30.

First Speed in the Drive "D" Range

In the first speed of the drive "D" range, as shown in Table 1, the first clutch C1 and the first and second one-way clutches F1 and F2 are engaged.

Figure 4:
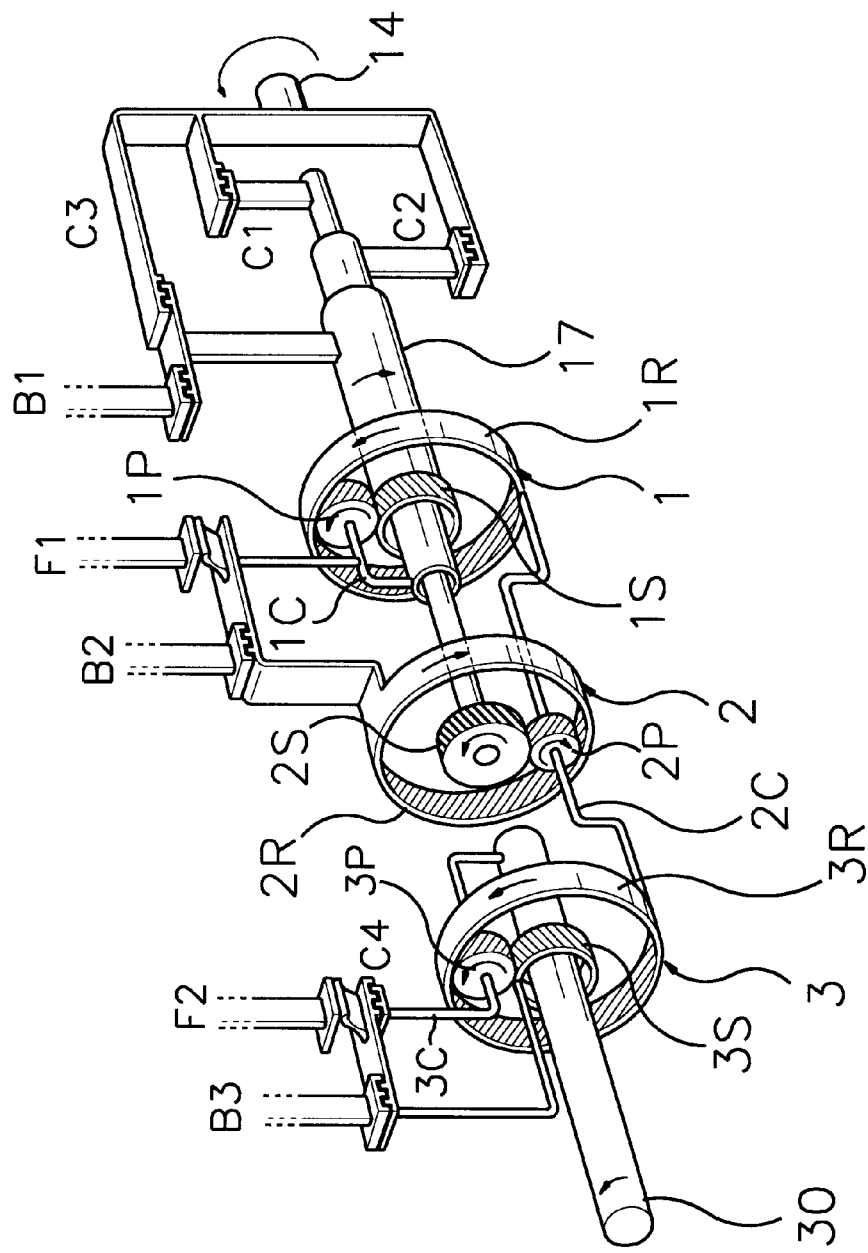
FIG. 4 is a perspective view showing the power train when the automatic transmission is in a first speed of a drive "D" range.

As shown in FIG. 4, when the rotating force of the input shaft 14 is transmitted to the sun gear 2S through the first clutch C1, the planet pinion gear 2P, which is engaged with the sun gear 2S, rotates about its axis in the opposite direction. Since the ring gear 2R engaged with the planet pinion gear 2P is prevented from rotating in direction opposite to the input shaft 14 by the first one-way clutch F1, the planet pinion gear carrier 2C supporting the planet pinion gear 2P rotates around the sun gear in the same direction of the sun gear 2S. The rotation of the planet pinion gear carrier 2P cause the ring gear 3R of the third planetary gearset to rotate in the same direction as the sun gear 2S. The planet pinion gear 3P, which is engaged with the ring gear 3R, rotates about its axis in the same direction as the ring gear 3R. As a result, the ring gear 3R of the third planetary gearset 3 acts as an input part at the third planetary gearset 3. The rotation of the planet pinion gear 3P of the third planetary gearset 3 exerts a force on the sun gear 3S that would cause the sun gear 3S to rotate in a direction opposite the ring gear 3R, however, the sun gear 3S is prevented from rotating in this direction by the second one-way clutch F2. Therefore, the planet pinion gear carrier 3C supporting the planet pinion gear 3P rotates in the same direction as the sun gear 2S of the second planetary gearset 2, and the input shaft 14, but at a lower rotational speed than the input shaft 14.

First Speed in Drive "D" Range When Engine Braking Occurs

When a vehicle incorporating the subject transmission is coasting while the transmission is operating in the first speed, the engine can be used to provide a braking force. A transmission gear selector lever may be used to keep the transmission in the first speed range. This would allow engine braking to occur, rather than having the transmission automatically shift up to the next speed range. In this shift stage, as shown in Table 1 and FIG. 4, the first clutch C1 is engaged, and the second and third brakes B2 and B3 are applied.

By the engagement of the first clutch C1, a rotating force is transmitted from the input shaft 14 to the sun gear 2S of the second planetary gearset 2. The planetary pinion gear 2P engaged with the sun gear 2S rotates about its axis with rotation of the sun gear 2S. Since the ring gear 2R is locked by the second brake B2, the planet pinion gear carrier 2C supporting the planet pinion gear 2P rotates in the same direction as the sun gear 2S.

In the third planetary gearset 3, the sun gear 3S is locked by the third brake B3. The ring gear 3R of the third planetary gearset rotates with the planet pinion gear carrier 2C of the second planetary gearset. The planet pinion gear 3P rotates in the same direction as the ring gear 3R, which causes the planet pinion gear carrier 3C and attached output shaft 30 to also rotate in the same direction as the ring gear 3R. Accordingly, power transmission is achieved as in the first speed.

Second Speed in Drive "D" Range

Figure 5:
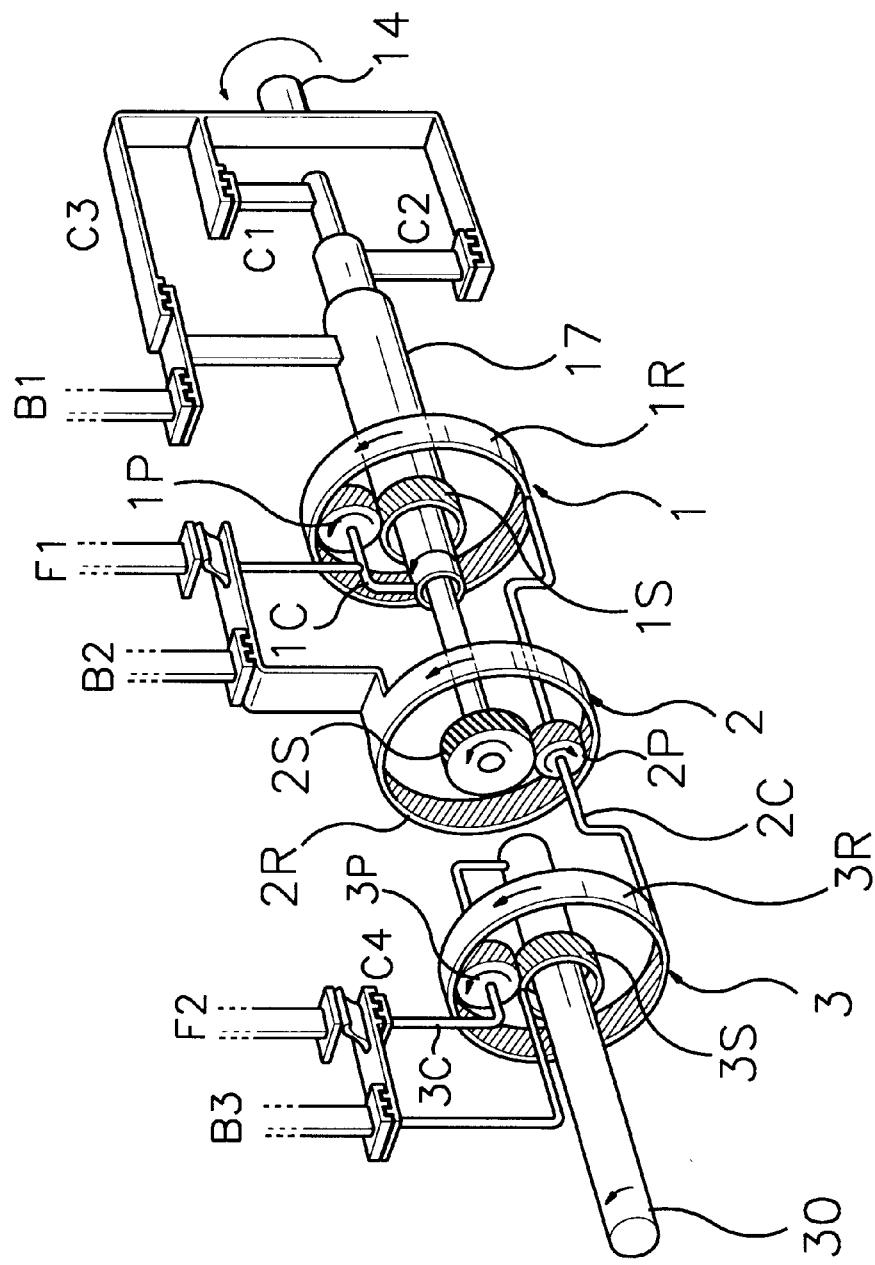
FIG. 5 is a perspective view showing the power train when the automatic transmission is in a second speed of a drive "D" range.

In this shift stage, as shown in Table 1 and FIG. 5 are engaged and the second one-way clutch F2, and the first clutch C1, the first brake B1 is applied.

Referring to FIG. 5, the rotating power of the input shaft 14 is transmitted to the sun gear 2S of the second planetary gearset 2 through the first clutch C1. The planet pinion gear 2P engaged with the sun gear 2S rotates about its axis in a direction opposite to the sun gear 2S. The rotation of the planet pinion gear 2P and the sun gear 2S causes the planet pinion gear carrier 2C to rotate in the same direction as the sun gear 2S. The rotating direction of the planet pinion gear carrier 2C is determined by the rotating directions of the ring gears 1R and 3R of the planetary gearsets 1 and 3, respectively. At this point, the ring gear 2R rotates in the rotating direction of the sun gear 2S, according to the rotating direction of the planet pinion gear carrier 2C.

In addition, the ring gear 3R, which is connected to the planet pinion gear carrier 2C of the second planetary gearset 2 through the connecting member 18, rotates in the same direction as the planet pinion gear carrier 2C of the second planetary gearset 2. The planet pinion gear 3P engaged with the ring gear 3R rotates about its axis in the same direction as the ring gear 3R. This, in turn, causes the planet pinion gear carrier 3C to also rotate in the same direction as the ring gear 3R. In addition, the sun gear 3S, which is engaged with the planet pinion gear 3P, rotates in accordance with the rotation of the planet pinion gear 3C, thereby obtaining the second speed.

Second Speed in Drive "D" Range When Engine Braking Occurs

When the vehicle is coasting while the transmission is operating in the second speed, the engine provides a braking force. In this shift stage, as shown in Table 1, the first clutch C1 is engaged, and the first brake B1, and the third brake B3 are applied. The power transmission in this speed stage is the same as in the second speed stage, thus the description thereof will be omitted herein.

As shown in FIG. 5, since the third brake B3 locks the sun gear 3S of the third planetary gearset 3, reverse power cannot be transmitted from the output shaft through the sun gear 3S of the third planetary gearset 3. This ensures that a torque from the vehicle drive wheels is applied to the vehicle engine, and engine braking occurs.

Partial Lock-Up in Second Speed

This shift stage is for obtaining a shift lock-up, which can provide advantages in that slippage which normally occurs when the vehicle runs with the transmission in the second speed, can be reduced 6–8%. By applying a clutch to achieve shift lock-up between an engine crankshaft and a turbine assembly of the transmission, the fuel consumption ratio can be improved, and engine speed can be reduced.

Since the friction members which are applied in this shift stage are the same as those in the second speed without engine braking, a description thereof will be omitted.

Third Speed in Drive "D" Range

Figure 6:
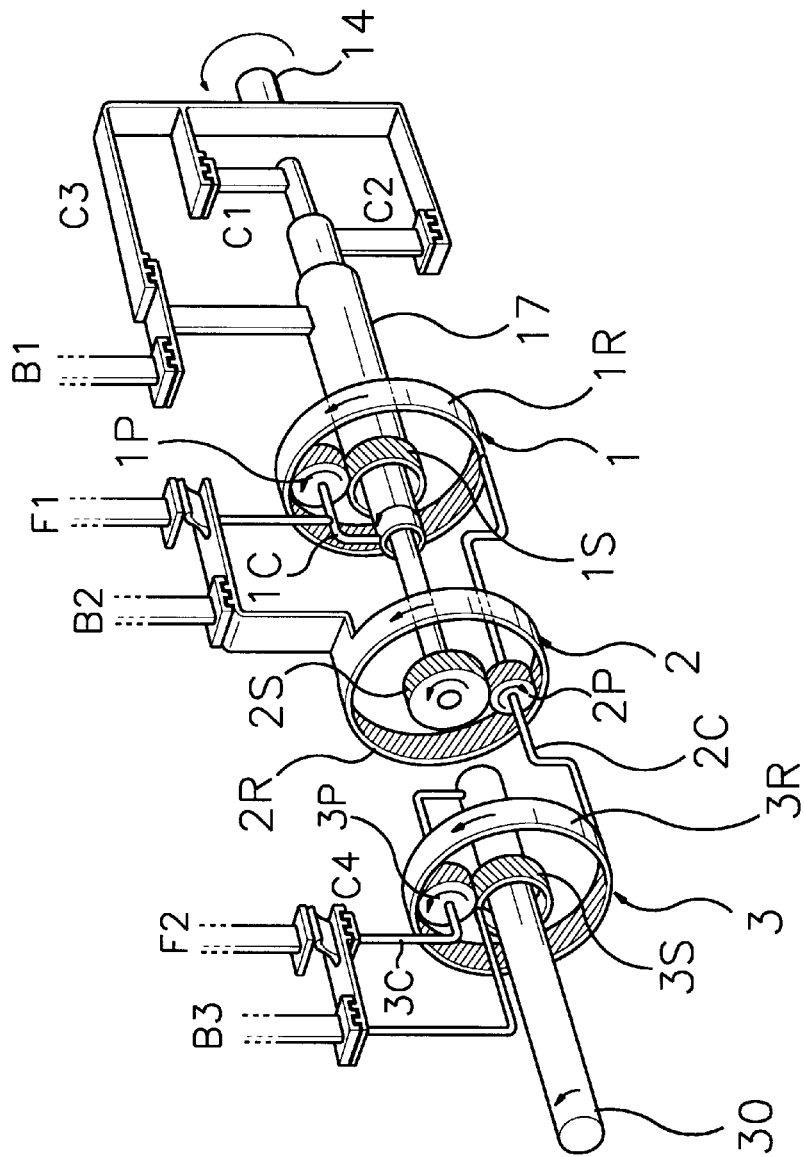
FIG. 6 is a perspective view showing the power train when the automatic transmission is in a third speed of a drive "D" range.

In this shift stage, as shown in Table 1 and FIG. 6, the first and second clutches C1 and C2, and the second one-way clutch F2 are engaged.

Referring to FIG. 6, the rotating force of the input shaft 14 is transmitted to the planet pinion gear carrier 1C of the first planetary gearset 1 and the sun gear 2S of the second planetary gearset 2 by first and second clutches C1 and C2. The rotating force transmitted to the planet pinion gear carrier 1C of the first planetary gearset 1 causes the sun gear 1S and the ring gear 1R, which are engaged with the planet pinion gear 1P to rotate. Thus, the ring gear 1R of the first planetary gearset 1 rotates in the same direction as the planet pinion gear carrier 1C of the first planetary gearset 1R.

Because the ring gear 1R of the first planetary gearset 1 is connected to the planet pinion gear carrier 2C of the second planetary gearset 2, the planet pinion gear carrier 2C of the second planetary gearset 2 rotates in the same direction as the ring gear 1R of the first planetary gearset 1.

In addition, since the sun gear 2S of the second planetary gearset 2 rotates in the same direction as the first planet pinion gear carrier 1C, and the planet pinion gear carrier 2C, all the elements of the second planetary gearset 2 rotate as a body in the same direction. In addition, since each of the elements of the first planetary gearset 1 rotate in the same direction, as shown in FIG. 6, the elements of the first planetary gearset 1 also rotate as a body.

The ring gear 3R connected to the second planetary gearset 2 through the planet pinion gear carrier 2C of the second planetary gearset 2 rotates in the same direction as the planet pinion gear carrier 2C of the second planetary gearset 2. The sun gear 3S of the third planetary gearset 3 is prevented from rotating in a direction opposite to the input shaft 14 by the second one-way clutch F2. Therefore, the planet pinion gear carrier 3C connected to the output shaft 30 rotates in the same direction as the ring gear 3R.

Third Speed in Drive "D" Range When Engine Braking Occurs

In this shift stage, as shown in Table 1, the third brake B3 is applied while the first and second clutches C1 and C2 are engaged. As in the second speed, since the sun gear 3S of the third planetary gearset 3 is locked by the third brake B3, reverse power cannot be transmitted from the output shaft 30 to other operating elements through the sun gear 3S of the third planetary gearset 3. Thus, torque from the drive wheels of the vehicle is applied to the engine, which provides a braking force.

Partial Lock-Up in Third Speed

This shift stage is for obtaining a shift lock-up, which can provide advantages in that slippage which normally occurs when the vehicle runs in the third speed can be reduced 6–8%. In addition, by applying a clutch to achieve a shift lock-up between an engine crankshaft and a torque converter assembly of the transmission, the fuel consumption ratio can be improved and engine speed can be reduced.

Since the friction members which are applied in this shift stage are the same as those in the third speed without engine, a description thereof will be omitted.

Complete Lock-Up in Third Speed

When the vehicle continuously runs with the transmission in a partial lock-up in the third speed, since the pressure of the torque convertor further increases, a complete lock-up is accomplished, and the power transmission thereof is the same as in the partial lock-up.

Fourth Speed in Drive "D" Range

Figure 7:
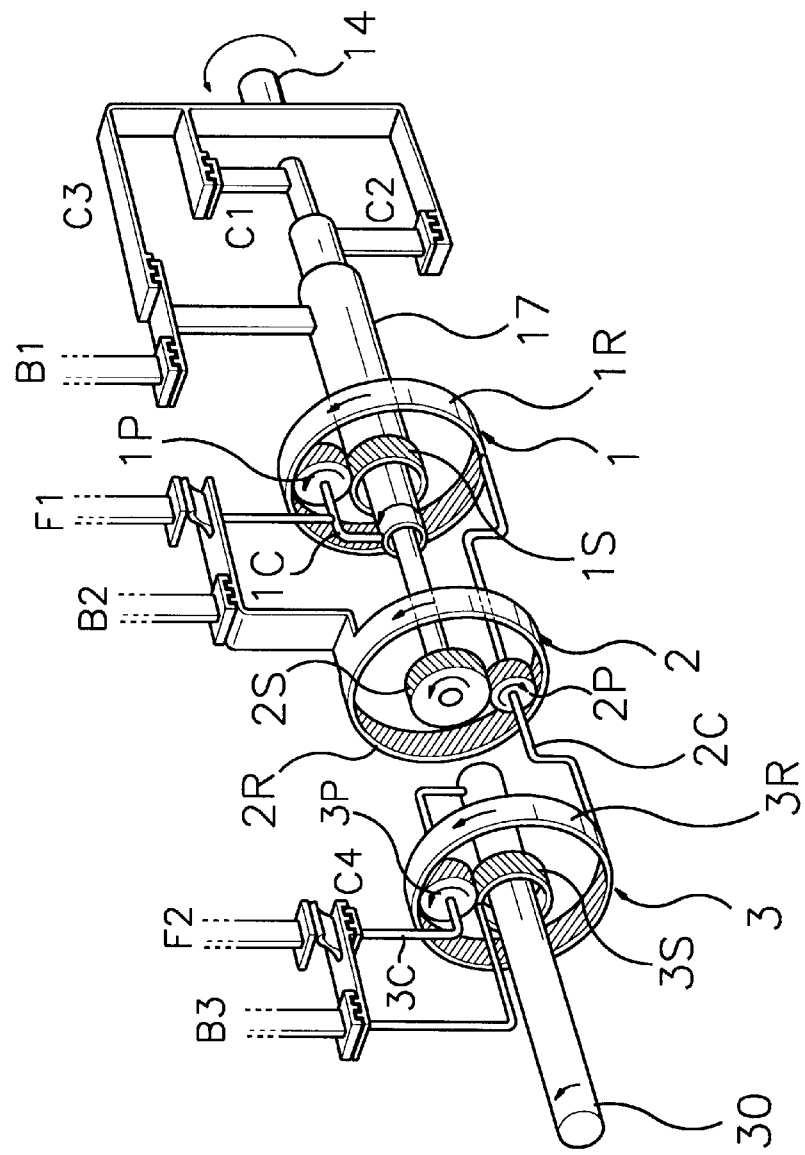
FIG. 7 is a perspective view showing the power train when the automatic transmission is in a fourth speed of a drive "D" range.

In this shift stage, as shown in Table 1 and FIG. 7, the first, second and fourth clutches C1, C2, and C4 are engaged.

Since the power transmission through the first and second clutches C1 and C2 is the same as in the third speed, a description thereof will be omitted herein.

In addition, with the engagement of the fourth clutch C4, the planet pinion gear carrier 3C rotates with the sun gear 3S. At this point, since the gear ratio is greater than 1, the vehicle runs in an overdrive state.

Lock-Up in Fourth Speed

As with the shift lock-up in the second and third speeds, a shift lock-up in the fourth speed can reduce engine speed and improve a fuel consumption ratio. Also, as in the lock-up control in the third speed, when the vehicle continuously runs with the transmission operating in the fourth speed in a partial lock-up, since the pressure of the torque convertor further increases, a complete lock-up is accomplished.

Fifth Speed in Drive "D" Range

Figure 8:
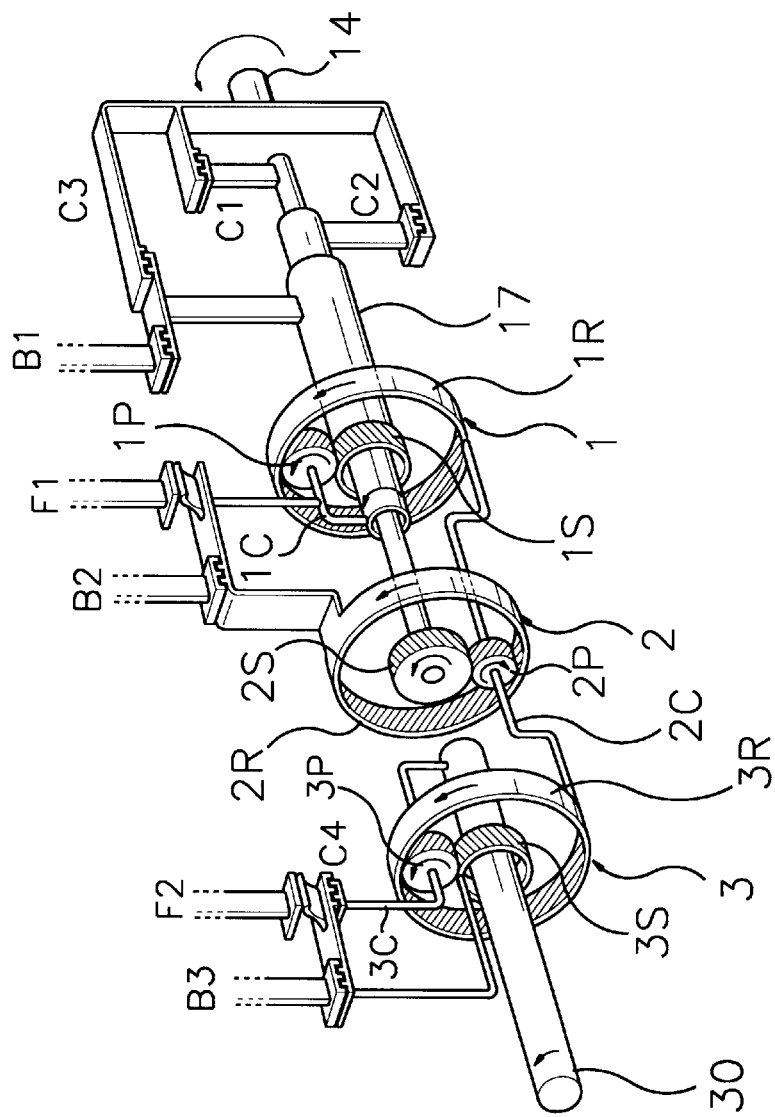
FIG. 8 is a perspective view showing the power train when the automatic transmission is in a fifth speed of a drive "D" range.

In this shift stage, as shown in Table 1 and FIG. 8, the second and fourth clutches C2 and C4 are engaged, and the first brake B1 is applied. As shown in FIG. 8, since the first brake B1 is applied in a state where the second, and fourth clutches C2 and C4 are engaged, the sun gear 1S of the first planetary gearset 1 is locked, and the rotating force of the input shaft 14 is transmitted to the planet pinion gear carrier 1C of the first planetary gearset 1. The rotation of the first planet pinion gear carrier 1C causes the second ring gear 1R to rotate in the same direction. This, in turn, causes the planet pinion gear carrier 2C of the second planetary gearset 2 to rotate due to the connecting member.

The rotation of the second planet pinion gear carrier 2C causes the third ring gear 3R to rotate. Also, the application of the fourth clutch C4 causes the sun gear 3S of the third planetary gearset 3 to rotate with the third planet pinion gear carrier 3C. Accordingly, the rotational speed of the output shaft 30 is increased by the gear ratio of the first planetary gearset 1. Therefore, a fifth speed, higher than the fourth speed, can be obtained. At this point, the gear ratio becomes greater than 1, and the vehicle runs in an overdrive state.

Lock-Up in Fifth Speed

As in the lock-up control in the third and fourth speeds, when the vehicle continuously runs with the transmission operating in the fifth speed in a partial lock-up, since the pressure of the torque convertor further increases, a complete lock-up is accomplished.

As described above, in a transmission embodying the present invention, since a one-way clutch structure is not used for all the friction members, the structure thereof can be simplified, thereby reducing the manufacturing cost.

Hydraulic Control System

The above described friction members (i.e., brakes and clutches) are controlled by a hydraulic control system which will be described hereinafter.

FIGS. 9 to 16 show a hydraulic circuit diagram of a hydraulic control system embodying the present invention. The hydraulic control system includes a line pressure regulator valve 103 supplying pressurized hydraulic fluid from a hydraulic pump 19 to a manual valve 101. A pilot valve 104 converts hydraulic pressure passing through the manual valve 101 into internal pilot hydraulic pressure. The system also includes a plurality of normally open solenoid valves 115, 116, 117, 118, 119 and 120, disposed in parallel, for controlling hydraulic pressure fed through the pilot valve 104. The system further includes a plurality of friction member control valves 105, 106, 107, 108, 109 and 110 for controlling the friction members C1, C2, C3, C4, B1, B2, and B3 in accordance with hydraulic pressure regulated by the solenoid valves. A pair of safety valves 111 and 112 prevent hydraulic pressure from being fed to improper friction members. A plurality of accumulators 122, 123, 124, 125 and 126 are disposed on lines between the friction member control valves and the friction members so as to prevent a shift shock caused by hydraulic pressure from occurring. A torque convertor reducing valve 102 reduces hydraulic pressure being fed toward the torque convertor. A lock-up clutch valve 114 directs hydraulic pressure reduced by the reducing valve 102 toward a lock-up clutch. The system also includes a directional control valve 113, which is controlled by line pressure so as to direct hydraulic pressure to the lock-up control valve 114. In addition, the hydraulic control system further comprises a hydraulic pump check valve 121, check valves 127 and 128, a main passage 200, and first to eighth passages 201, 202, 203, 204, 205, 206, 207 and 208.

Here, the first safety valve 111 is for preventing the third brake B3 from being applied when the fourth clutch is engaged, and the second safety valve 112 is for preventing hydraulic pressure applied to the first brake B1 from being applied to other friction members when the first brake B1 is not operated properly.

The operation of the hydraulic control system at each speed range will be described hereinafter.

Parking "P" and Neutral "N" Ranges

Figure 9:
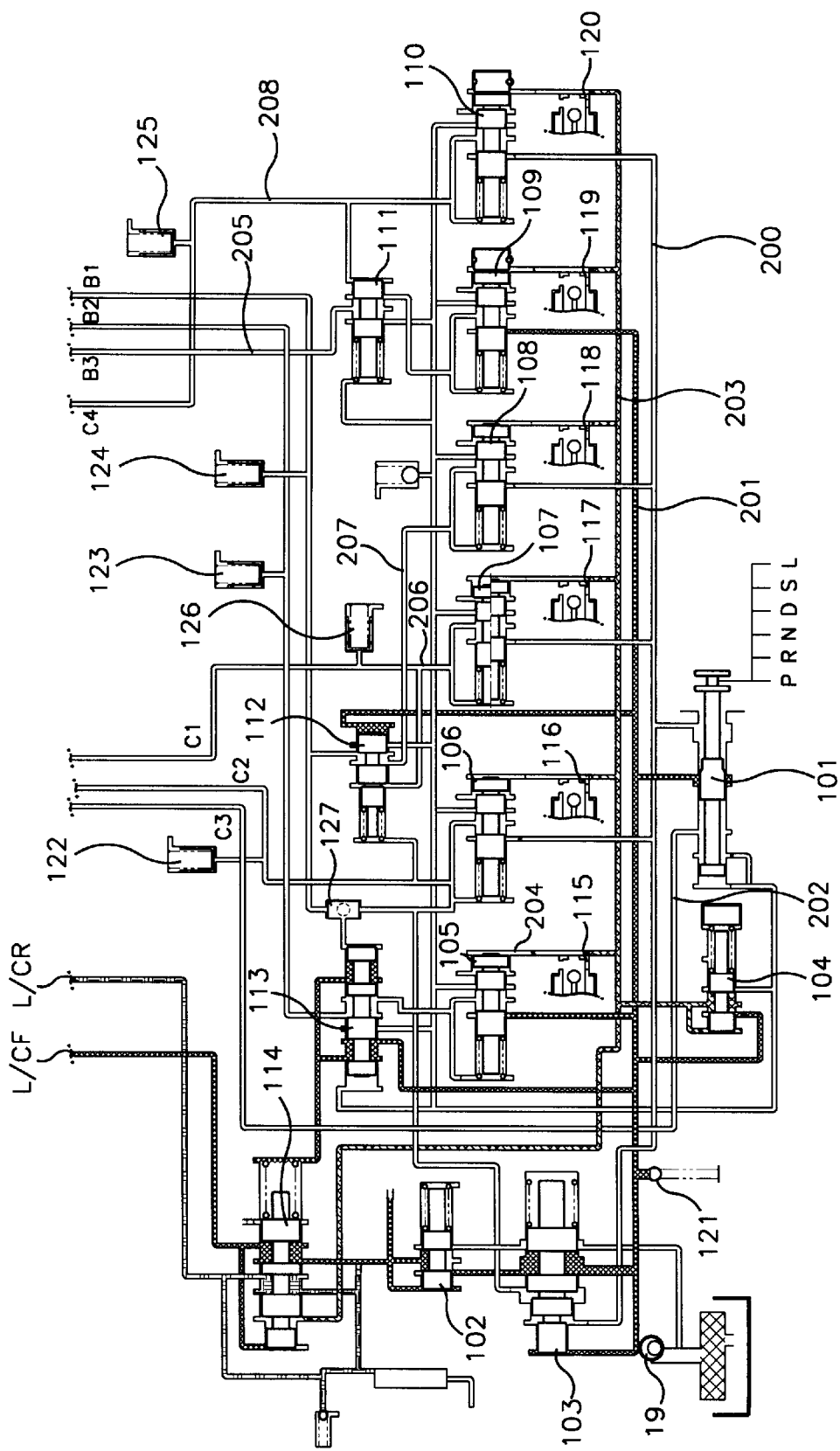
FIG. 9 is a hydraulic circuit diagram showing the location of hydraulic pressure of a hydraulic control system according to the present invention when the system is in a parking "P" range.

As shown in FIG. 9, when the manual valve 101 cooperating with a shift selector lever is displaced toward a parking position P, no hydraulic pressure is applied to the shift unit of the transmission. In other words, hydraulic pressure which is pressurized by the hydraulic pump 19 during the vehicle's running is released from each of the friction members when the engine stops, thereby returning the friction members to their initial, disengaged positions under the action of corresponding springs.

Figure 10:
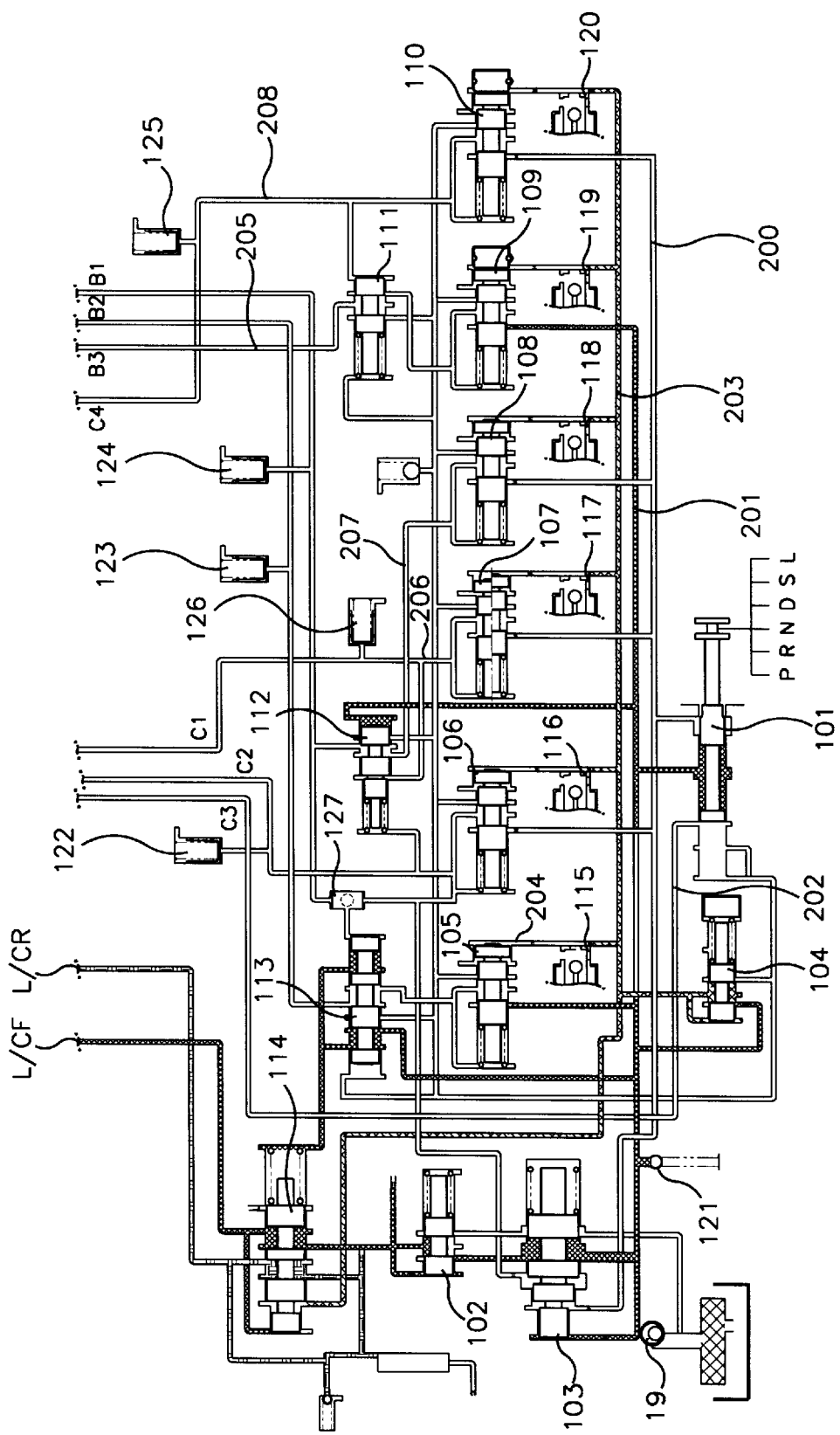
FIG. 10 is a hydraulic circuit diagram showing the location of hydraulic pressure of a hydraulic control system according to the present invention when the system is in a neutral "N" range.
Figure 11:
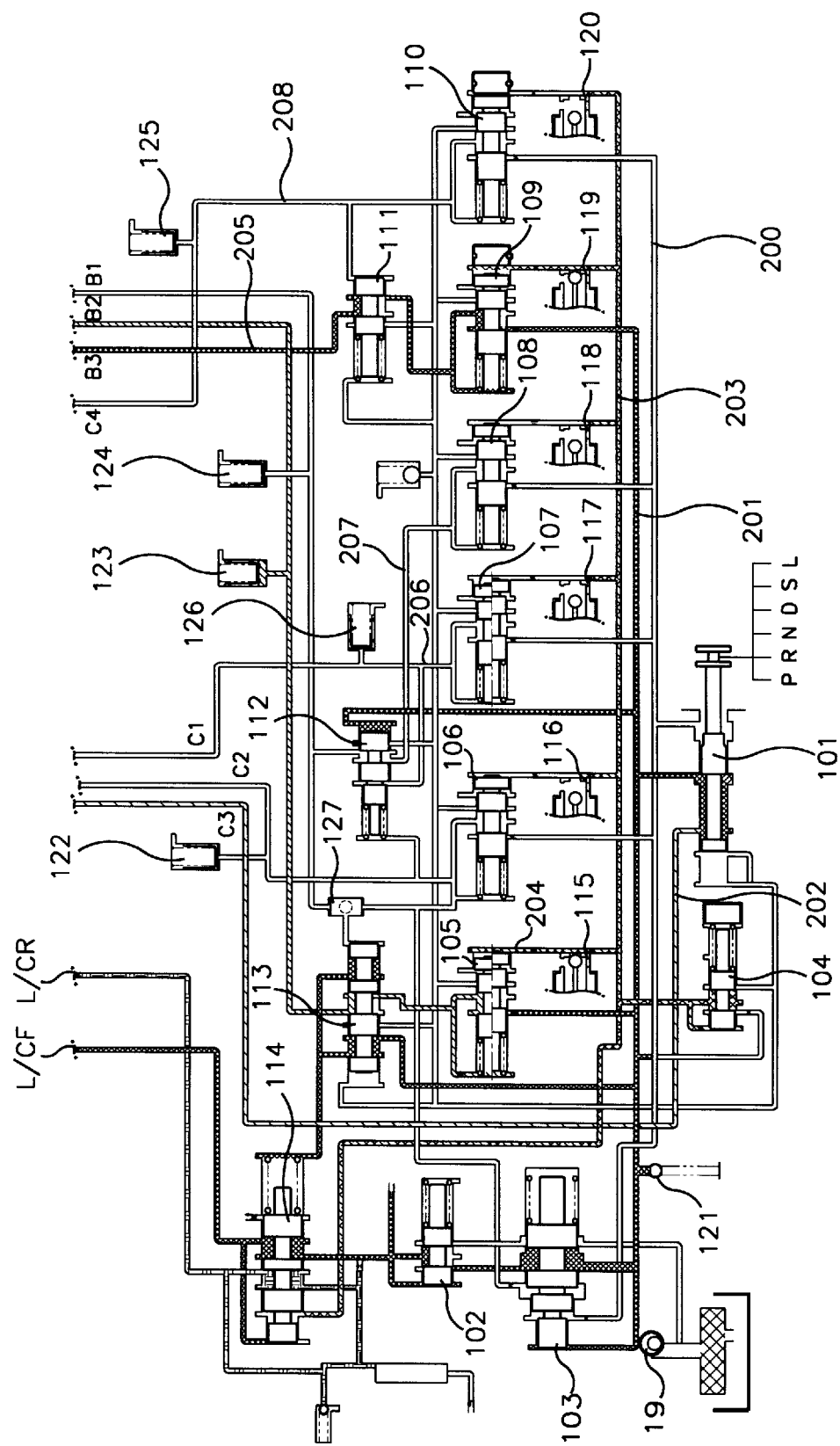
FIG. 11 is a hydraulic circuit diagram showing the location of hydraulic pressure of a hydraulic control system according to the present invention when the system is in a reverse "R" range.

As shown in FIG. 10, when the manual valve 101 is displaced toward a neutral position N, although the engine operates, since the power of engine is not intended to be transmitted to the output shaft, all the hydraulic passages connected to the friction member are blocked. At this point, when hydraulic pressure becomes higher than a predetermined level, hydraulic fluid fed to the passages of the system by the hydraulic pump 19 is drained to a holding tank through the hydraulic pump check valve 121 mounted on the first passage 201.

Reverse "R" Range

This range is for reversing the vehicle. As shown in Table 1, in this range, the third clutch C3, and the second and third brakes B2 and B3 are applied.

Hydraulic fluid pressurized by the hydraulic pump 19 is fed to the third clutch C3 along the first and second passages 201 and 202, by the manual valve 101.

A portion of the hydraulic pressure in the first passage 201 is also fed to the pilot valve 104, where it is converted to pilot pressure, which then flows along the third passage 203. Excess hydraulic pressure is drained through the hydraulic pump check valve 121 mounted on the first passage 201, when it increases above a predetermined pressure level. Therefore, by controlling the spring force of the hydraulic pump check valve 121 mounted on the first passage 201, hydraulic pressure flowing along the first passage 201 can be varied.

A plurality of passages branch off from the third passage 203. A plurality of normally open solenoid valves 115, 116, 117, 118, 119 and 120 are mounted, respectively, on the branched passages. The solenoid valves 115, 116, 117, 118, 119 and 120 open or close the branched passages according to signals from a Transmission Control Unit (TCU) in accordance with the operation of the shift selector lever.

When the transmission is shifted into the reverse "R" range, the first and fifth solenoid valves 115 and 119 are activated so as to open the fourth and fifth passages 204 and 205, which are connected to the second brake B2 and the third brake B3, respectively.

Hydraulic pressure flows along the fourth passage 204 and activates a valve spool of the second brake control valve 105 mounted on the fourth passage 204. As a result, the passage which was obstructed by the second brake control valve 105 is opened, and hydraulic pressure is fed to the piston for the second brake B2 through the second brake control valve 105 and the directional control valve 113, thereby applying the second brake B2.

Here, since the piston for the second brake B2 is operated by hydraulic pressure that is partially absorbed by the accumulator 123 for the second brake B2, the second brake B2 is smoothly applied and a shift shock can be prevented.

Hydraulic pressure flows along the passage leading to the third brake control valve 109 when the fifth solenoid valve 119 is activated. This causes activation of the third brake control valve 109, which causes hydraulic pressure to flow through the third brake control valve 109, through the safety valve 111, and along the fifth passage 205 where it is applied to the piston 29 for the third brake. This causes the third brake B3 to be applied.

First Speed in Drive "D" Range

Figure 12:
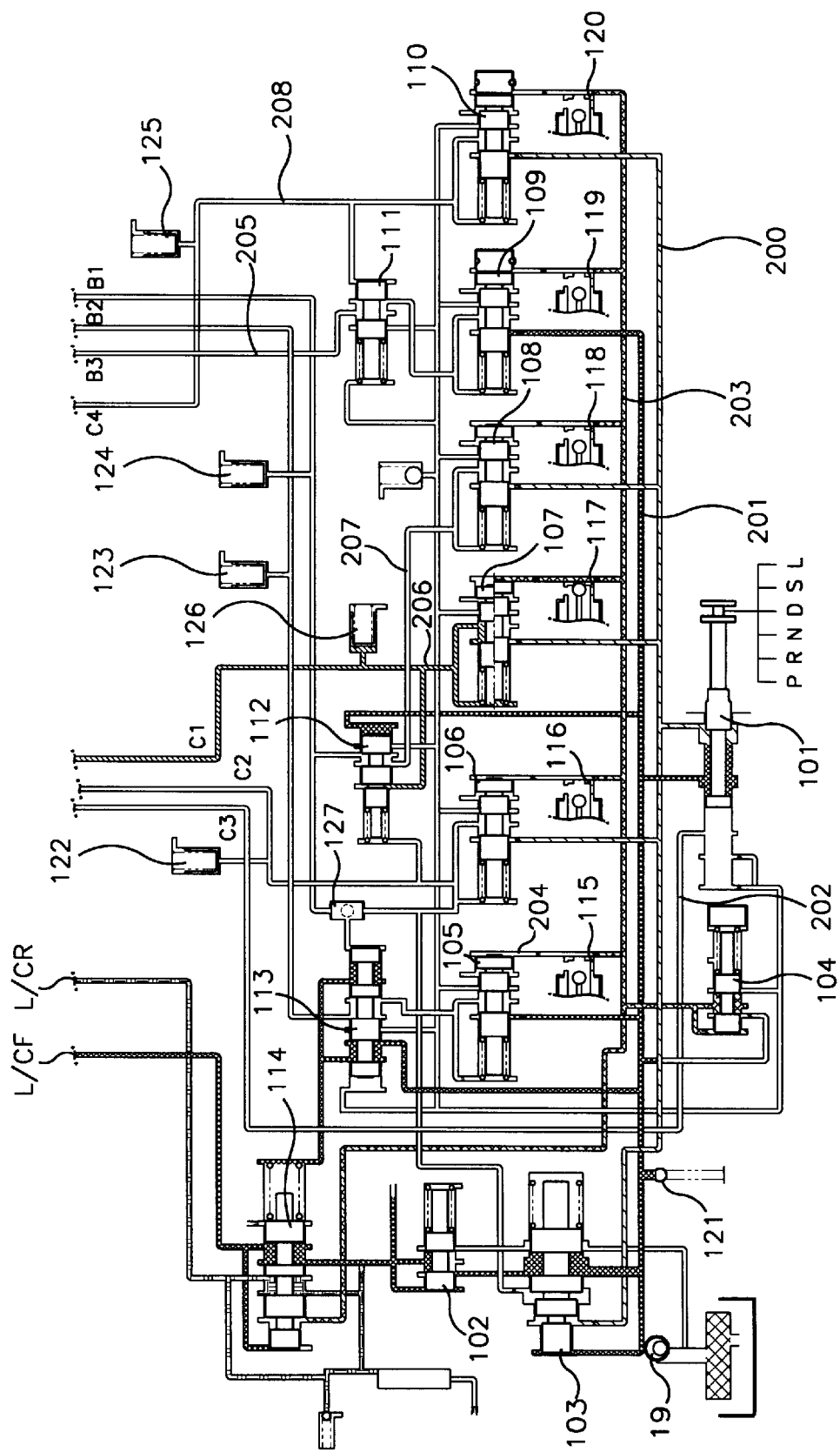
FIG. 12 is a hydraulic circuit diagram showing the location of hydraulic pressure of a hydraulic control system according to the present invention when the system is in a first speed of a drive "D" range.

In this speed stage, as shown Table 1, the first clutch C1 and the first and second one-way clutches F1 and F2 are engaged. FIG. 12 shows a hydraulic circuit diagram for applying these friction members.

As shown in FIG. 12, when the shift selector lever is shifted to the first speed of the drive "D" range, the manual valve 101 cooperating with the gear selection lever is displaced to the drive "D" position. The third solenoid valve 117 is activated by a signal from the TCU. By the operation of the third solenoid valve 117, hydraulic pressure within the third passage 203 activates the first clutch control valve 107.

Accordingly, hydraulic pressure fed to the main passage 200 through the manual valve 101 is fed through the first clutch control valve 107 to the sixth passage 206, which is connected to the first clutch C1, thereby operating the piston for the first clutch C1 and engaging the first clutch C1. At this point, since the accumulator 126 for the first clutch is mounted on the sixth passage 206, shift shock can be prevented.

First Speed in Drive "D" Range When Engine Braking Occurs

When the vehicle runs with the transmission operating in the first speed during coasting, engine braking occurs.

In this shift stage, as shown in Table 1, the first clutch C1 is engaged, and the second and third brakes B2 and B3 are applied.

Hydraulic pressure control for engaging the first clutch C1 and applying the second and third brakes B2 and B3 are described above in the description relating to the first speed in the drive "D" range and the reverse "R" range, respectively. Thus, the details thereof will be omitted.

Second Speed in Drive "D" Range

In this speed stage, as shown in Table 1, the first clutch C1 and the second one-way clutch F2 are engaged and the first brake B1 is applied.

The shift operation from the first speed, where the third solenoid valve 117 is activated to the second speed is accomplished by shifting the gear selector lever. When shifting the gear selector lever, the TCU continuously inputs signals to the third solenoid valve 117 and additionally inputs signals to activate the first and fourth solenoid valves 115 and 118.

Figure 13:
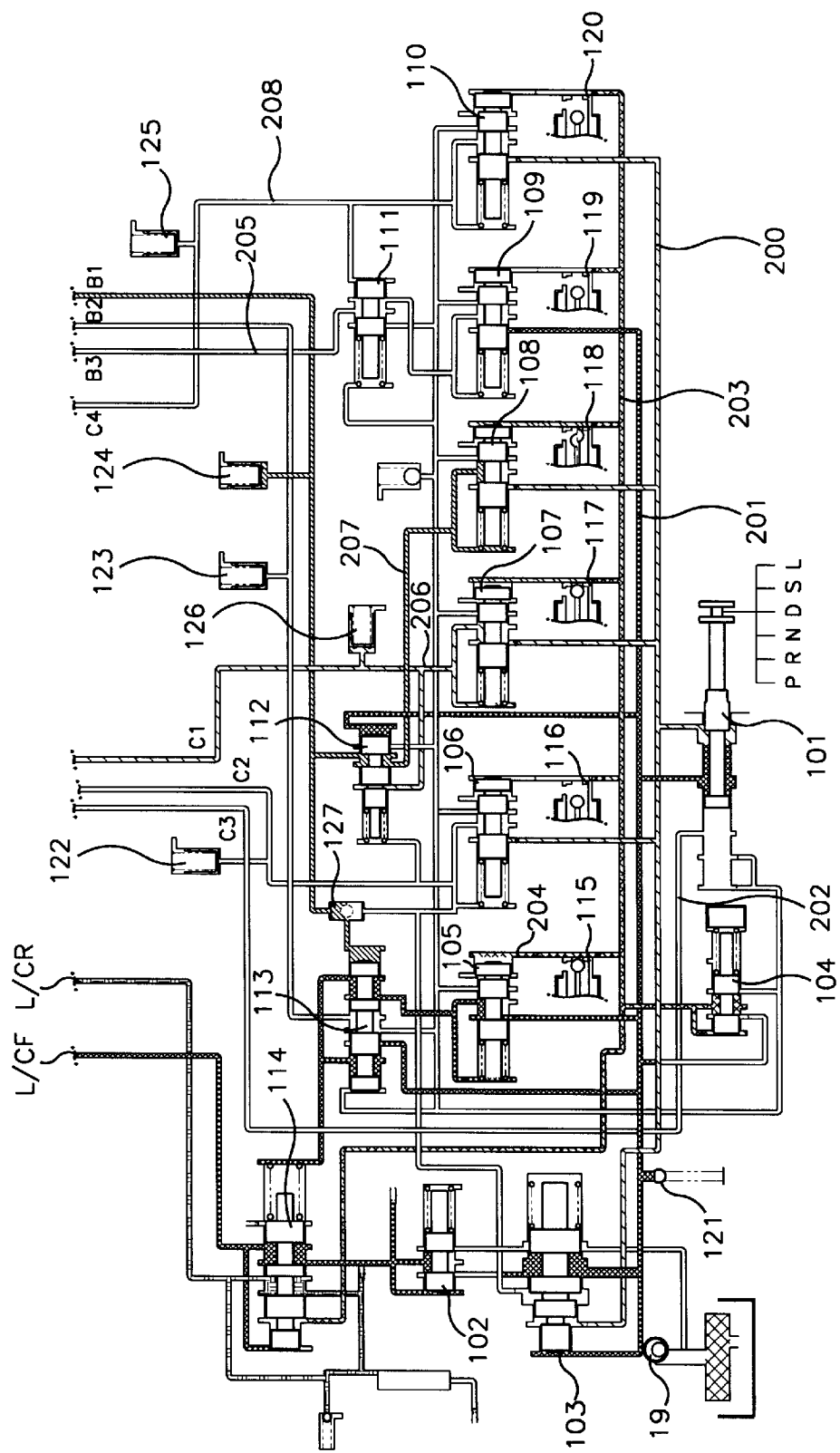
FIG. 13 is a hydraulic circuit diagram showing the location of hydraulic pressure of a hydraulic control system according to the present invention when the system is in a second speed of a drive "D" range.

The activation of the fourth solenoid valve 118 causes hydraulic pressure to be applied to the valve spool of the first brake control valve 108, which is displaced so that, as shown in FIG. 13, hydraulic pressure in the main passage 200 can flow to the seventh passage 207 through the first brake control valve 108. In addition, hydraulic pressure flowing along the seventh passage 207 is directed to only the first brake B1 by the second safety valve 112, thereby preventing hydraulic pressure from being fed to improper friction members.

The hydraulic pressure passing through the second safety valve 112 pushes the piston for the first brake, thereby applying the first brake B1. At this point, since the hydraulic pressure is partially accumulated by the accumulator 124, a shift shock that could occur when shifting from the first speed to the second speed can be prevented.

In addition, in this speed stage, the hydraulic pressure fed to the seventh passage 207 displaces the check valve 127 mounted on the passage communicating with the directional control valve 113. This displacement of the check valve 127 ensures that the hydraulic pressure passing through the second brake valve 105 is prevented from being fed to the second brake B2.

Second Speed in Drive "D" Range When Engine Braking Occurs

When the vehicle runs with the transmission operating in the second speed while coasting, engine braking occurs. In this shift stage, as shown in Table 1, the first clutch C1 is engaged, and the first and third brakes B1 and B3 are applied. Since the hydraulic pressure control for applying these friction members is already described above, the details will be omitted herewith.

Partial Lock-Up in Second Speed

This shift stage is for obtaining a shift lock-up by applying a clutch between an engine crankshaft and the torque converter. This can provide advantages in that slippage which normally occurs when the vehicle runs with the transmission in the second speed, can be reduced 6–8%, the fuel consumption ratio can be improved, and the engine speed can be reduced.

In this stage, the TCU deactivates the first solenoid valve 115 which was activated in the second speed so that the hydraulic pressure within the third passage 203 is no longer applied to the valve spool of the second brake control valve 105. As a result, hydraulic pressure passing through the first passage 201 cannot be fed to the lock-up control valve 114 by the second brake control valve 105. The operation of the fourth solenoid valve 118 and the first brake control valve 108, reduces the hydraulic pressure acting on the lock-up control valve 114. Therefore, the lock-up control valve 114 is displaced in a direction so as to block the passage connecting the hydraulic pump 19 to the torque convertor, thereby reducing the hydraulic pressure fed to the torque convertor. The hydraulic pressure passing through the manual valve 101, however, is fed to the lock-up control clutch by the displacement of the lock-up control valve 114, thereby increasing the hydraulic pressure at the lock-up clutch. By the engagement of the lock-up clutch according to this pressure difference, a partial lock-up is accomplished. The operation of the lock-up control valve 114 is performed when the lock-up is operated. Thus, slip control is initiated.

Third Speed in Drive "D" Range

In this speed stage, as shown in Table 1, the first and second clutches C1 and C2, and the second one-way clutch F2 is engaged.

Figure 14:
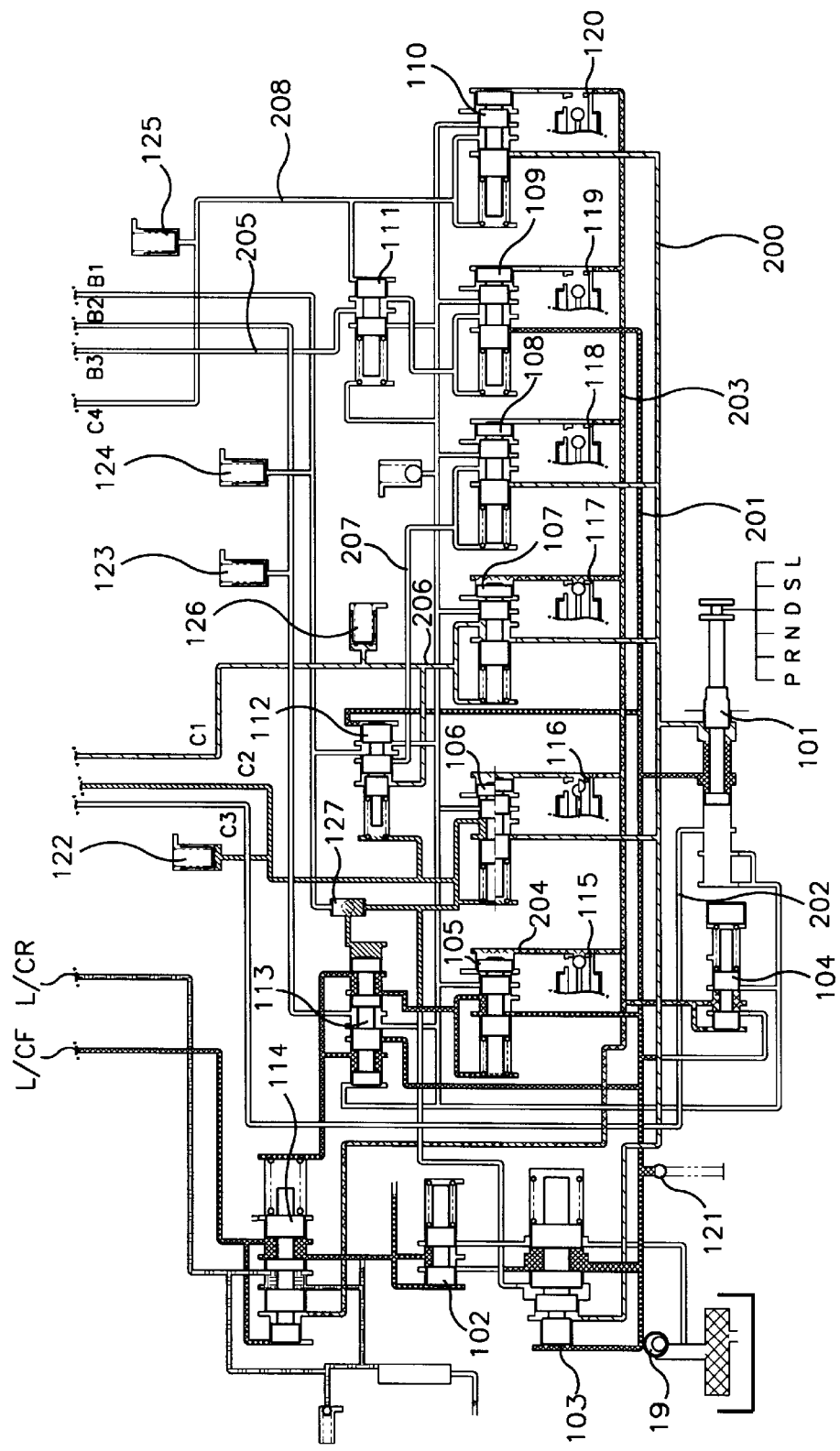
FIG. 14 is a hydraulic circuit diagram showing the location of hydraulic pressure of a hydraulic control system according to the present invention when the system is in a third speed of a drive "D" range.

When the vehicle speed is further increased from the second speed, as shown in FIG. 14, the TCU controls the fourth solenoid valve 118 to be deactivated so that the hydraulic pressure acting on the first brake control valve 108 is reduced. Accordingly, the first brake control valve 108 interrupts the hydraulic pressure fed to the first brake B1.

At the same time, the TCU activates the second solenoid valve 116, which feeds hydraulic pressure to the second clutch control valve 106. The hydraulic pressure acting on the valve spool of the second clutch control valve 106 causes the hydraulic pressure fed to the main passage 200 to be fed to the second clutch C2 through the second clutch control valve 106. Since the hydraulic pressure being directed to the second clutch C2 is gradually increased by the accumulator 122 for the second clutch C2, a shift shock is prevented.

In addition, the directional control valve 113 is configured such that the hydraulic pressure flowing along the first passage 201 is directed to the lock-up control valve 114, and such that hydraulic pressure is blocked from passing to the first brake B1, by the hydraulic pressure passing through the second clutch control valve 106 and the check valve 127. The first safety valve 112 is configured such that the hydraulic pressure passing through the second clutch control valve 106 also cannot be directed to the first brake B1.

In addition, as shown in FIG. 14, since the hydraulic pressure fed to each friction member in this speed stage is operated by hydraulic pressure regulated by the manual valve 101, without passing through the line pressure regulator valve 103, the hydraulic pressure can be regulated to a reduced pressure.

Third Speed in Drive "D" Range When Engine Braking Occurs

When the vehicle runs with the transmission operating in the third speed while coasting, engine braking occurs. In this shift stage, as shown in Table 1, the first and second clutches C1 and C2 are engaged, and the third brake B3 is applied. Since the hydraulic pressure control for applying the third brake B3 is already described above, the details will be omitted herein.

Partial Lock-Up in Third Speed

Since the hydraulic control for obtaining the partial lock-up in the third speed is the same as in the partial lock-up in the second speed, the details will be omitted herein.

Lock-Up in Third Speed

When the vehicle runs with the partial lock-up in third speed, since the hydraulic pressure of the torque convertor pushes the valve spool of the lock-up control valve 114, the lock-up control valve 114 is completely displaced in a direction. As a result, the hydraulic pressure flowing along the first passage 201 cannot be fed to the lock-up control valve 114 by the second brake control valve 105, thereby reducing the hydraulic pressure acting on the lock-up control valve 114 through the first passage 201. Therefore, lock-up control valve 114 is completely moved toward one side, the passage connected to the torque convertor is blocked, thereby further reducing the hydraulic pressure fed to the torque convertor. However, the hydraulic pressure passing through the line pressure regulator valve 103 and the torque convertor reducing valve 102 is increased by the displacement, completing the lock-up.

Fourth Speed in Drive "D" Range

In this shift stage, as shown in Table 1, the first, second and fourth clutches C1, C2, and C4 are engaged.

Figure 15:
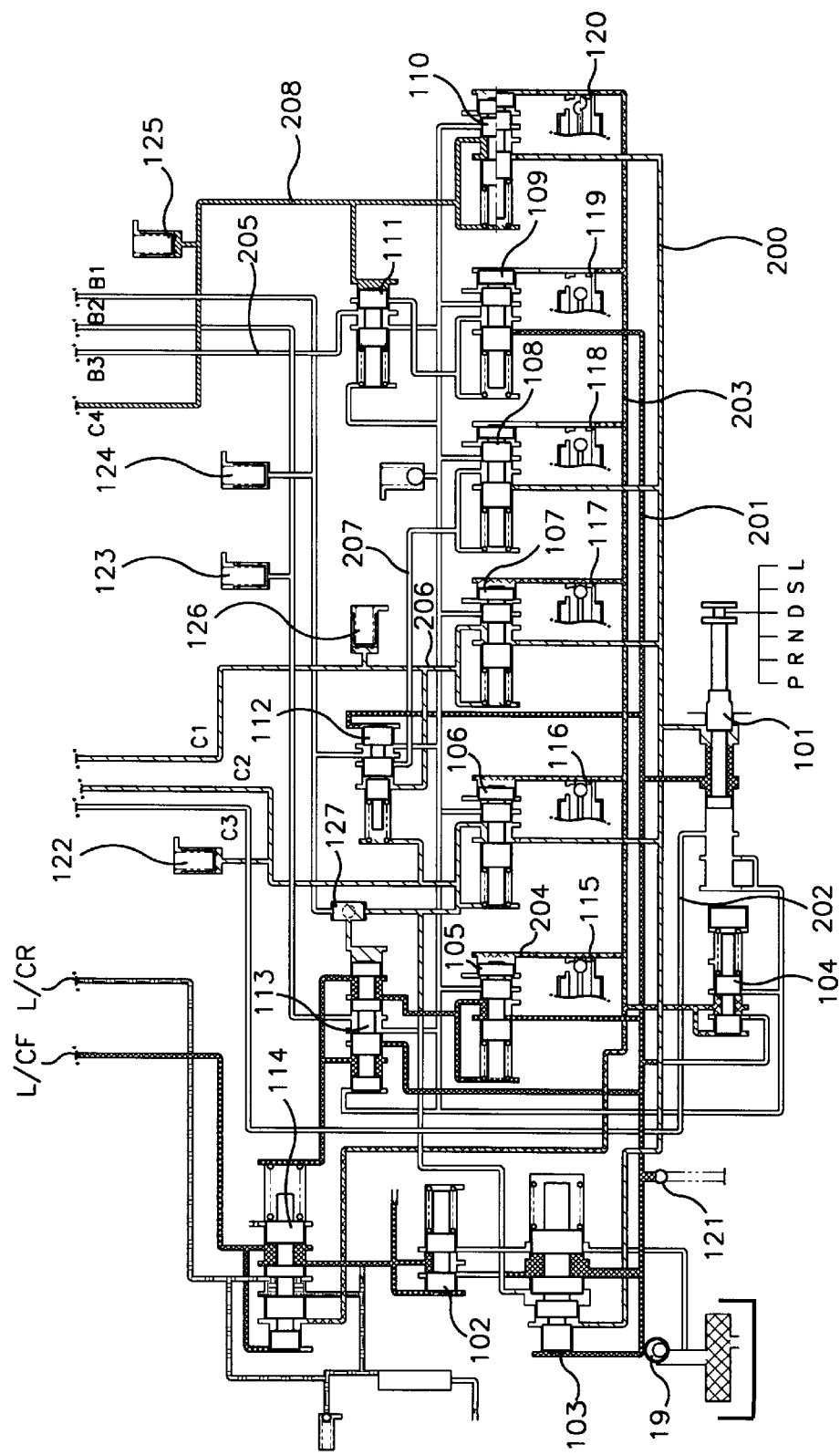
FIG. 15 is a hydraulic circuit diagram showing the location of hydraulic pressure of a hydraulic control system according to the present invention when the system is in a fourth speed of a drive "D" range.
Figure 16:
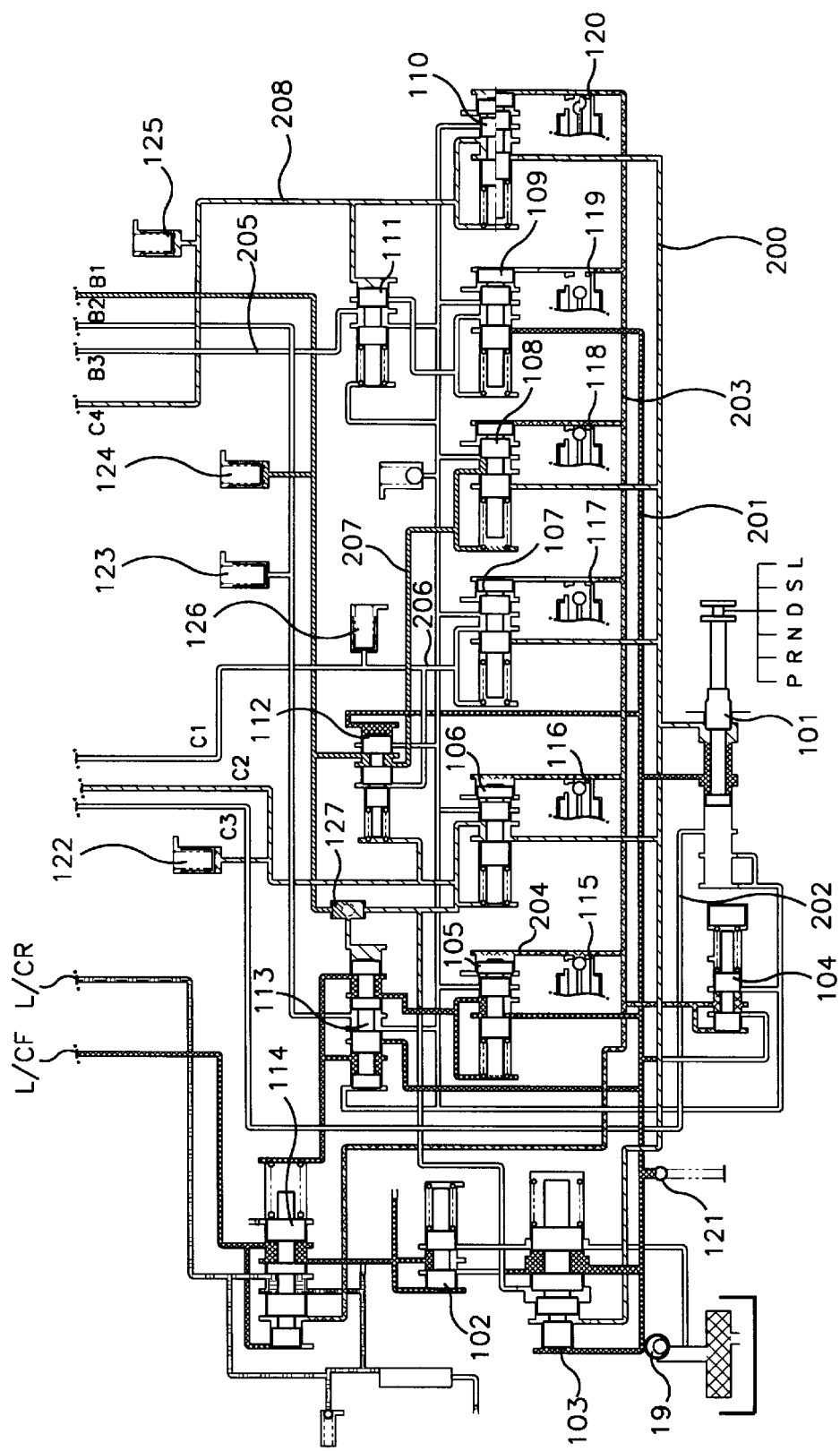
FIG. 16 is a hydraulic circuit diagram showing the location of hydraulic pressure of a hydraulic control system according to the present invention when the system is in a fifth speed of a drive "D" range.

As shown in FIG. 15, in a state where the first and second clutches C1 and C2 are continuously applied, the sixth solenoid valve 120 is operated by a signal of the TCU. Therefore, the system is operated by hydraulic pressure which does not pass through the line pressure regulator valve 103.

The sixth solenoid valve 120 is activated, which allows the hydraulic pressure fed through the third passage 203 to push one face of the valve spool of the fourth clutch control valve 110, displacing the valve spool toward one side. As a result, hydraulic pressure is directed through the main passage 200 toward the eighth passage 208 connected to the fourth clutch C4. The accumulator 125 mounted on the eighth passage 208 alleviates a shift shock when the fourth clutch C4 is applied.

Lock-Up in Fourth Speed

As in the lock-up control of the third speed, by the control of the TCU, the hydraulic pressure of the torque convertor displaces the lock-up valve 114. As a result, the hydraulic pressure passing through the first passage 201 cannot be fed to the lock-up control valve 114 by the second brake control valve 105, and the hydraulic pressure acting on the lock-up control valve 114 from the first passage 201 is further reduced. Therefore, since the lock-up control valve is completely moved in a direction, the passage communicating with the torque convertor is completely blocked, thereby reducing the hydraulic pressure being fed to the torque convertor. However, the hydraulic pressure passing through the line pressure regulator valve 103 and the torque convertor reducing valve 102 is increased by the displacement, thus completing the lock-up.

Fifth Speed in Drive "D" Range

In this shift stage, as shown in Table 1, the second and fourth clutches C2 and C4 are engaged, and the first brake B1 and the fourth clutch C4 are applied.

To shift from the fourth speed to the fifth speed, the TCU deactivates the third solenoid valve 117, which blocks hydraulic pressure from reaching the first clutch control valve 107. This causes the first clutch C1 to disengage. In addition, the TCU operates the fourth solenoid valve 118 so that hydraulic pressure from the main passage 200 can communicate with the seventh passage 207 through the first brake control valve 108. The hydraulic pressure pushes the piston for the first brake through the first brake control valve 108 so as to apply the first brake B1. At this point, since the accumulator 124 is mounted on the seventh passage 207, a shift shock is prevented.

Lock-Up in Fifth Speed

As in the lock-up control of the third and fourth speeds, by the control of the TCU, the hydraulic pressure of the torque convertor displaces the lock-up valve 114 in a direction. As a result, the hydraulic pressure passing through the first passage 201 cannot be fed to the lock-up control valve 114 by the second brake control valve 105, and the hydraulic pressure acting on the lock-up control valve 114 from the first passage 201 is further reduced. Therefore, since the lock-up control valve is completely moved in a direction, the passage communicating with the torque convertor is completely blocked, thereby reducing the hydraulic pressure being fed to the torque convertor. However, the hydraulic pressure passing through the line pressure regulator valve 103 and the torque convertor reducing valve 102 is increased by the displacement, completing the lock-up.

As described above, in the hydraulic control system of an automatic transmission embodying the present invention, the line pressure is regulated by only the line pressure regulator valve 103 without using a line pressure regulating solenoid valve. In the P, N and R ranges, the hydraulic pressure is regulated to be high. In the D range, the hydraulic pressure is regulated to be low. In the third and fourth speeds, where no line pressure is required, the hydraulic pressure is regulated to be low.

In addition, the line pressure from the hydraulic pump 19 is directly fed to the second brake control valve 105, the third brake control valve 109 and the second safety valve 112 without passing through the manual valve 101. Hydraulic pressure from the hydraulic pump 19 is also fed through the directional control valve 113 in all shift stages except for the lock-up stage, thereby preventing the lock-up.

Furthermore, because the line pressure is fed to the second brake control valve 105 regardless of the range selected by the manual valve 101, since start of the vehicle is performed by the backup pressure of the lock-up control valve 114, the lock-up can be prevented. Also, by supplying hydraulic pressure to the third brake control valve 109, the second and third brakes B2 and B3 can be applied in the reverse "R" and drive "D" ranges.

Since the line pressure is fed to the first, second and fourth clutch control valves 107, 106, 110 through the manual valve 101, to cause hydraulic pressure to be applied the friction members which are to be applied in the drive "D" range, malfunction in other ranges can be prevented.

The hydraulic pressure regulated by the second brake control valve 105 makes it possible for the lock-up clutch and the second brake B2 to change their direction by the operation of the directional control valve 113. The directional control valve 113 directs hydraulic pressure regulated by the second brake control valve 105 toward the second brake B2 while the transmission is operating in the first speed and engine braking is required. In addition, in the second, third, fourth, and fifth speeds, the backup pressure of the lock-up control valve 114 allows for a shift lock-up. By this arrangement, one combination of the second brake control valve 105 and the directional control valve 113 can perform two functions, thereby simplifying the structure of the hydraulic control system. In addition, the hydraulic control system prevents the second brake B2 from being applied while the transmission operates in the second, third, fourth, and fifth speeds, thereby preventing the system from operating improperly when the system malfunctions.

The first safety valve 111 prevents the third brake B3 from operating when the fourth clutch C4 is applied, and the second safety valve 112 prevents hydraulic pressure acting on the first brake B1 from being applied to other friction members when the first and second clutches C1 and C2 are applied. That is, by preventing the first and second clutches C1 and C2 and the first brake B1 from being applied simultaneously, the system prevents an interlock from occurring. The safety valves 111 and 112 allow the vehicle to drive with the fourth speed in the drive "D" range and with the reverse speed in the reverse "R" range.

The foregoing embodiments are merely exemplary and are not to be construed as limiting the present invention. While this invention has been described in connection with what is presently considered to be the most practical and preferred embodiment, it is to be understood that the invention is not limited to the disclosed embodiments, but is intended to cover various modifications and equivalent arrangements as would be apparent to those skilled in the art, as would be included within the spirit and scope of the appended claims.

What is claimed is:

1. A transmission for a vehicle, comprising:

a housing;

an input shaft;

an output shaft;

a torque convertor connectable to an engine for transmitting engine power to the input shaft;

first, second and third planetary gearsets, disposed between the input and output shafts to transmit power from the input shaft to the output shaft;

a first clutch that selectively connects a sun gear of the second planetary gearset to the input shaft;

a second clutch that selectively connects a planet pinion gear carrier of the first planetary gearset to the input shaft;

a third clutch that selectively connects a sun gear of the first planetary gearset to the input shaft; and a fourth clutch that selectively connects a sun gear and a planet pinion gear carrier of the third planetary gearset with each other, wherein the fourth clutch is applied when the transmission is operating in fourth and fifth forward speeds.

2. The transmission of claim 1, wherein ring gears of the first and third planetary gearsets are connected to a planet pinion gear carrier of the second planetary gearset by connecting members.

3. The transmission of claim 1, wherein the planet pinion gear carrier of the third planetary gearset is connected to the output shaft.

4. The transmission of claim 1, wherein the third clutch is applied when the transmission is operating in a reverse speed.

5. The transmission of claim 1, further comprising a one-way clutch for ensuring that the planet pinion gear carrier of the first planetary gearset and a ring gear of the second planetary gearset rotate in a single direction.

6. The transmission of claim 5, wherein the one-way clutch for ensuring that the planet pinion gear carrier of the first planetary gearset and the ring gear of the second planetary gearset rotate in a single direction comprises a first one-way clutch, and further comprising a second one-way clutch for ensuring that the sun gear of the third planetary gearset rotates in a single direction.

7. The transmission of claim 1, further comprising a brake for selectively fixing the sun gear of the first planetary gearset relative to the housing.

8. The transmission of claim 7, wherein the brake for selectively fixing the sun gear of the first planetary gearset relative to the housing comprises a first brake, and further comprising a second brake for selectively fixing a ring gear of the second planetary gearset and the planet pinion gear carrier of the first planetary gearset relative to the housing.

9. The transmission of claim 8, further comprising a third brake for selectively fixing the sun gear of the third planetary gearset relative to the housing.

10. The transmission of claim 9, further comprising:

a first one-way clutch for selectively ensuring that the planet pinion gear carrier of the first planetary gearset and the ring gear of the second planetary gearset rotate in a single direction; and a second one-way clutch for selectively ensuring that the sun gear of the third planetary gearset rotates in a single direction.

11. The transmission of claim 10, wherein ring gears of the first and third planetary gearsets are connected to a planet pinion gear carrier of the second planetary gearset by connecting members.

12. The transmission of claim 11, wherein the planet pinion gear carrier of the third planetary gearset is connected to the output shaft.

13. The transmission of claim 12, wherein the third clutch is applied when the transmission is operating in a reverse speed.

14. A transmission for a vehicle, comprising:

a housing;

an input shaft;

an output shaft;

a torque converter connectable to an engine for transmitting engine power to the input shaft;

first, second and third planetary gearsets, disposed between the input and output shafts to transmit power from the input shaft to the output shaft;

a clutch that selectively connects a sun gear and a planet pinion gear carrier of the third planetary gearset with each other, wherein the clutch is applied when the transmission is operating in fourth and fifth forward speeds.

15. The transmission of claim 14, further comprising a one-way clutch for ensuring that a planet pinion gear carrier of the first planetary gearset and a ring gear of the second planetary gearset rotate in a single direction.

16. The transmission of claim 15, wherein the one-way clutch for ensuring that the planet pinion gear carrier of the first planetary gearset and the ring gear of the second planetary gearset rotate in a single direction comprises a first one-way clutch, and further comprising a second one-way clutch for ensuring that the sun gear of the third planetary gearset rotates in a single direction.

17. The transmission of claim 14, further comprising a brake for selectively fixing a sun gear of the first planetary gearset relative to the housing.

18. The transmission of claim 17, wherein the brake for selectively fixing the sun gear of the first planetary gearset relative to the housing comprises a first brake, and further comprising a second brake for selectively fixing a ring gear of the second planetary gearset and a planet pinion gear carrier of the first planetary gearset relative to the housing.

19. The transmission of claim 18, further comprising a third brake for selectively fixing the sun gear of the third planetary gearset relative to the housing.

20. The transmission of claim 19, wherein the ring gears of the first and third planetary gearsets are connected to a planet pinion gear carrier of the second planetary gearset by connecting members.

* * * * *